United States Patent
Yamada et al.

(10) Patent No.: US 10,766,972 B2
(45) Date of Patent: Sep. 8, 2020

(54) MODIFIED CONJUGATED DIENE-BASED POLYMER AND METHOD FOR PRODUCING THE SAME, AND MODIFIED CONJUGATED DIENE-BASED POLYMER COMPOSITION

(71) Applicant: Asahi Kasei Kabushiki Kaisha, Tokyo (JP)

(72) Inventors: Chigusa Yamada, Tokyo (JP); Yukio Yamaura, Tokyo (JP); Kenta Hisamura, Tokyo (JP); Junichi Yoshida, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 133 days.

(21) Appl. No.: 15/551,548

(22) PCT Filed: Feb. 19, 2016

(86) PCT No.: PCT/JP2016/054869
§ 371 (c)(1),
(2) Date: Aug. 16, 2017

(87) PCT Pub. No.: WO2016/133202
PCT Pub. Date: Aug. 25, 2016

(65) Prior Publication Data
US 2018/0037674 A1 Feb. 8, 2018

(30) Foreign Application Priority Data
Feb. 19, 2015 (JP) .................................. 2015-031082

(51) Int. Cl.
| | |
|---|---|
| C08C 19/25 | (2006.01) |
| C08K 3/36 | (2006.01) |
| C08F 8/00 | (2006.01) |
| C08L 15/00 | (2006.01) |
| C08L 9/06 | (2006.01) |
| C08F 236/06 | (2006.01) |

(52) U.S. Cl.
CPC ............... *C08C 19/25* (2013.01); *C08F 8/00* (2013.01); *C08F 236/06* (2013.01); *C08K 3/36* (2013.01); *C08L 9/06* (2013.01); *C08L 15/00* (2013.01)

(58) Field of Classification Search
CPC . C08C 19/25; C08C 19/22; C08L 9/06; C08L 9/00; C08F 236/06; C08F 236/08; C08F 236/10
See application file for complete search history.

(56) References Cited

U.S. PATENT DOCUMENTS

| | | | |
|---|---|---|---|
| 2003/0199669 A1 | 10/2003 | Saito et al. | |
| 2013/0023624 A1* | 1/2013 | Sekikawa | ............... C08C 19/44 524/572 |

FOREIGN PATENT DOCUMENTS

| | | |
|---|---|---|
| EP | 2003146 A2 | 12/2008 |
| EP | 2338919 A1 | 6/2011 |
| EP | 2700658 A1 | 2/2014 |
| EP | 2749575 A1 | 7/2014 |
| EP | 2754674 A1 | 7/2014 |
| JP | H07-233217 A | 9/1995 |
| JP | 2001-158834 A | 6/2001 |
| JP | 2003-171418 A | 6/2003 |
| JP | WO2007/114203 A1 | 8/2009 |
| JP | 2009-227858 A | 10/2009 |
| JP | 2013-082826 A | 5/2013 |
| JP | 2013-087219 A | 5/2013 |
| JP | 2013-129693 A | 7/2013 |
| JP | WO2011/129425 A1 | 7/2013 |
| JP | 2015-113437 A | 6/2015 |
| WO | 2001/023467 A1 | 4/2001 |
| WO | 2011 129425 | * 10/2011 |

OTHER PUBLICATIONS

International Search Report issued in corresponding International Patent Application No. PCT/JP2016/054869 dated May 17, 2016.
International Preliminary Report on Patentability and Written Opinion issued in corresponding International Patent Application No. PCT/JP2016/054869 dated Aug. 22, 2017.
Supplementary European Search Report issued in counterpart European Patent Application No. 16752588.0 dated Nov. 30, 2017.

* cited by examiner

*Primary Examiner* — Kuo Liang Peng
(74) *Attorney, Agent, or Firm* — Morgan, Lewis & Bockius LLP

(57) ABSTRACT

The present invention provides a modified conjugated diene-based polymer, wherein the Mooney stress-relaxation rate measured at 110° C. is 0.45 or less, and the modification percentage is 75% by mass or more.

19 Claims, No Drawings

MODIFIED CONJUGATED DIENE-BASED POLYMER AND METHOD FOR PRODUCING THE SAME, AND MODIFIED CONJUGATED DIENE-BASED POLYMER COMPOSITION

TECHNICAL FIELD

The present invention relates to a modified conjugated diene-based polymer and a method for producing the same, and a modified conjugated diene-based polymer composition.

BACKGROUND OF INVENTION

Increasing requirements for automobiles with lower fuel consumption have recently created demand for a tire having low rolling resistance. To obtain such a tire, a rubber material with low heat generation property has been demanded as a rubber material for tire tread, which is directly in contact with the ground surface. In contrast, such a rubber material for tire tread is required to have excellent breaking performance on wet roads (wet skid resistance) and a fracture strength sufficient for practical use from the viewpoint of safety.

Examples of rubber materials meeting such requirements include a rubber composition with silica as a reinforcing filler for rubber materials. In addition, there exists a rubber composition with a diene-based rubber having a functional group interactive with the surface of silica, and the diene-based rubber provides silica in the rubber composition with satisfactory dispersibility and provides excellent low heat generation property due to its high affinity to the surface of silica.

For example, Patent Literature 1 discloses a modified diene-based rubber obtained through reacting a modifier having a glycidylamino group with a polymer terminal, and Patent Literature 2 discloses a modified diene rubber obtained through reacting a glycidoxyalkoxysilane with a polymer terminal. Patent Literatures 3 and 4 disclose a modified diene rubber obtained through reacting alkoxysilanes containing an amino group with a polymer terminal, and a composition of the diene-based rubber and silica. Moreover, Patent Literature 5 discloses a diene-based rubber obtained through subjecting an active polymer terminal and a polyfunctional silane compound to coupling reaction.

CITATION LIST

Patent Literature

Patent Literature 1: International Publication No. WO01/23467
Patent Literature 2: Japanese Patent Laid-Open No. 07-233217
Patent Literature 3: Japanese Patent Laid-Open No. 2001-158834
Patent Literature 4: Japanese Patent Laid-Open No. 2003-171418
Patent Literature 5: International Publication No. WO 07/114203

SUMMARY OF INVENTION

Technical Problem

However, rubber compositions obtained through blending silica having a hydrophilic surface in a diene rubber, which has high hydrophobicity, are poor in dispersibility due to the aggregation of silica particles. When a modified diene-based rubber in which a functional group having high reactivity to silica has been introduced to the polymer terminal is blended with silica to form a rubber composition as disclosed in Patent Literatures 1 to 5, reaction between the silica particle and the functional group of the modified diene-based rubber proceeds during kneading process. As a result, high viscosity is imparted to the rubber composition, and the high viscosity is likely to result in deterioration in processability such as difficulty in kneading and generation of a rough surface or torn part in formation of a sheet after kneading. When such a rubber composition is converted into a vulcanizate, in particular, converted into a vulcanizate containing an inorganic filler, the rigidity or dynamic elastic modulus is lowered, and as a result the operation stability is deteriorated. In addition, such a vulcanizate has insufficient balance between low hysteresis loss and wet skid resistance.

Thus, an object of the present invention is to provide a modified conjugated diene-based polymer being excellent in processability during conversion into a vulcanizate, and being excellent in balance between low hysteresis loss and wet skid resistance, and fracture strength and abrasion resistance after conversion into a vulcanizate.

Solution to Problem

The present inventors diligently studied to solve the above-described problems inherent in conventional arts, and found that a modified conjugated diene-based copolymer having a Mooney stress-relaxation rate and modification percentage each in a particular range is excellent in processability during conversion into a vulcanizate, and is excellent in balance between low hysteresis loss and wet skid resistance, and fracture strength and abrasion resistance after conversion into a vulcanizate, and thus completed the present invention.

Specifically, the present invention is as follows.

[1]
A modified conjugated diene-based polymer,
wherein a Mooney stress-relaxation rate measured at 110° C. is 0.45 or less, and
a modification percentage is 75% by mass or more.

[2]
The modified conjugated diene-based polymer according to [1], comprising a nitrogen atom, wherein
a content of the nitrogen atom is 25 ppm by mass or more based on a total amount of the modified conjugated diene-based polymer.

[3]
The modified conjugated diene-based polymer according to [1] or [2], comprising a nitrogen atom at one or more terminal, and
a star-shaped polymer structure having a nitrogen atom-containing alkoxysilane substituent positioned at a center thereof.

[4]
The modified conjugated diene-based polymer according to any of [1] to [3], wherein a shrinkage factor (g') determined by gel permeation chromatography (GPC)-light scattering measurement with a viscosity detector is 0.86 or less.

[5]
The modified conjugated diene-based polymer according to any of [1] to [4], wherein a ratio of the second number-average molecular weight determined by GPC-light scattering measurement to the first number-average molecular weight determined by measurement with GPC is 1.00 or more.

[6]

The modified conjugated diene-based polymer according to any of [1] to [5], wherein a ratio of the second weight-average molecular weight determined by GPC-light scattering measurement to the first weight-average molecular weight determined by measurement with GPC is 1.00 or more.

[7]

The modified conjugated diene-based polymer according to any of [1] to [6], wherein the first number-average molecular weight is 200000 or more and 2000000 or less, and a ratio of the first weight-average molecular weight to the first number-average molecular weight is 1.50 or more and 3.50 or less.

[8]

The modified conjugated diene-based polymer according to any of [1] to [7], represented by following general formula (A) or (B):

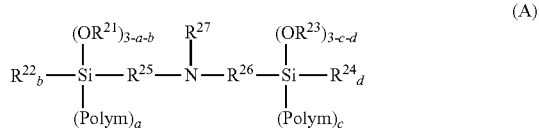

(A)

wherein $R^{21}$ to $R^{24}$ each independently denote an alkyl group having 1 to 20 carbon atoms or an aryl group having 6 to 20 carbon atoms; $R^{25}$ and $R^{26}$ each independently denote an alkylene group having 1 to 20 carbon atoms; $R^{27}$ denotes a hydrogen atom, a silyl group substituted with a hydrocarbon, an alkyl group having 1 to 20 carbon atoms, or an aryl group having 6 to 20 carbon atoms; a and c each independently denote an integer of 1 or 2; b and d each independently denote an integer of 0 or 1; (a+b) and (c+d) each independently denote an integer of 2 or less; (Polym) denotes a conjugated diene-based polymer derived by polymerization of a conjugated diene compound or copolymerization of a conjugated diene compound and an aromatic vinyl compound, wherein at least one terminal thereof is a functional group represented by any of general formulas (4) to (7) below; in a case that a plurality of moieties is present as $R^{21}$, $R^{23}$, or (Polym) they are independent of each other

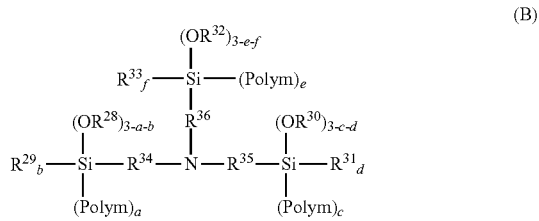

(B)

wherein $R^{28}$ to $R^{33}$ each independently denote an alkyl group having 1 to 20 carbon atoms or an aryl group having 6 to 20 carbon atoms; $R^{34}$ to $R^{36}$ each independently denote an alkylene group having 1 to 20 carbon atoms; a, c, and e each independently denote an integer of 1 or 2; b, d, and f each independently denote an integer of 0 or 1; (a+b), (c+d), and (e+f) each independently denote an integer of 2 or less; (Polym) denotes a conjugated diene-based polymer derived by polymerization of a conjugated diene compound or copolymerization of a conjugated diene compound and an aromatic vinyl compound, wherein at least one terminal thereof is a functional group represented by any of following general formulas (4) to (7); in a case that a plurality of moieties is present as $R^{28}$, $R^{30}$, $R^{32}$, or (Polym) they are independent of each other;

(4)

wherein $R^{10}$ and $R^{11}$ each independently denote at least one selected from the group consisting of an alkyl group having 1 to 12 carbon atoms, a cycloalkyl group having 3 to 14 carbon atoms, and an aralkyl group having 6 to 20 carbon atoms; $R^{10}$ and $R^{11}$ may be attached together to form a cyclic structure together with an adjacent nitrogen atom, and in this case, $R^{10}$ and $R^{11}$ denote an alkyl group having 5 to 12 carbon atoms, and may have an unsaturated bond or a branched structure in a part thereof;

(5)

wherein $R^{12}$ and $R^{13}$ each independently denote at least one selected from the group consisting of an alkyl group having 1 to 12 carbon atoms, a cycloalkyl group having 3 to 14 carbon atoms, and an aralkyl group having 6 to 20 carbon; $R^{12}$ and $R^{13}$ may be attached together to form a cyclic structure together with an adjacent nitrogen atom, and in this case, $R^{12}$ and $R^{13}$ denote an alkyl group having 5 to 12 carbon atoms, and may have an unsaturated bond or a branched structure in a part thereof; $R^{14}$ denotes an alkylene group having 1 to 20 carbon atoms or a conjugated diene-based polymer having 1 to 20 carbon atoms;

(6)

wherein $R^{15}$ and $R^{16}$ each independently denote at least one selected from the group consisting of an alkyl group having 1 to 12 carbon atoms, a cycloalkyl group having 3 to 14 carbon atoms, and an aryl group having 6 to 20 carbon atoms; and $R^{15}$ and $R^{16}$ may be attached together to form a cyclic structure together with an adjacent nitrogen atom, and in this case, $R^{15}$ and $R^{16}$ denote an alkyl group having 5 to 12 carbon atoms, and may have a branched structure in a part thereof;

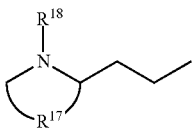
(7)

wherein $R^{17}$ denotes a hydrocarbon group having 2 to 10 carbon atoms, and may have an unsaturated bond or a branched structure in a part thereof; and $R^{18}$ denotes an alkyl group having 1 to 12 carbon atoms, and may have a branched structure in a part thereof.

[9]

A method for producing the modified conjugated diene-based polymer according to any of [1] to [8], comprising steps of:

polymerizing at least a conjugated diene compound in a presence of an organolithium compound having at least one nitrogen atom in a molecule to obtain a conjugated diene-based polymer; and modifying the conjugated diene-based polymer with a modifier having four or more alkoxy groups bonding to a silyl group and a tertiary amino group in one molecule.

[10]

The method for producing the modified conjugated diene-based polymer according to [9], wherein the modifier comprises a modifier represented by any of following general formulas (1) to (3):

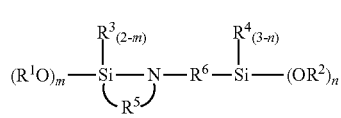
(1)

wherein $R^1$ to $R^4$ each independently denote an alkyl group having 1 to 20 carbon atoms or an aryl group having 6 to 20 carbon atoms; $R^5$ denotes an alkylene group having 1 to 10 carbon atoms; $R^6$ denotes an alkylene group having 1 to 20 carbon atoms; m denotes an integer of 1 or 2; n denotes an integer of 2 or 3; (m+n) denotes an integer of 4 or more; and in a case that a plurality of moieties is present as any of $R^1$ to $R^4$, they are independent of each other;

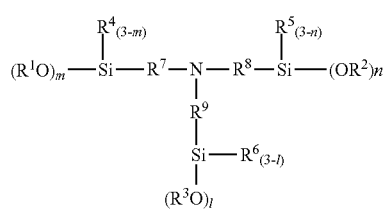
(2)

wherein $R^1$ to $R^6$ each independently denote an alkyl group having 1 to 20 carbon atoms or an aryl group having 6 to 20 carbon atoms; $R^7$ to $R^9$ each independently denote an alkylene group having 1 to 20 carbon atoms; m, n, and l each independently denote an integer of 1 to 3; (m+n+l) denotes an integer of 4 or more; and in a case that a plurality of moieties is present as any of $R^1$ to $R^6$, they are independent of each other;

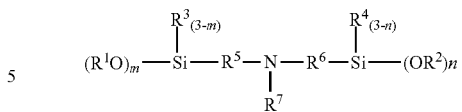
(3)

wherein $R^1$ to $R^4$ each independently denote an alkyl group having 1 to 20 carbon atoms or an aryl group having 6 to 20 carbon atoms; $R^5$ and $R^6$ each independently denote an alkylene group having 1 to 20 carbon atoms; m and n each independently denote an integer of 1 to 3; (m+n) denotes an integer of 4 or more; $R^7$ denotes an alkyl group having 1 to 20 carbon atoms, an aryl group having 6 to 20 carbon atoms, or a silyl group substituted with a hydrocarbon group; and in a case that a plurality of moieties is present as any of $R^1$ to $R^4$, they are independent of each other.

[11]

The method for producing the modified conjugated diene-based polymer according to [10], wherein the modifier comprises a modifier represented by the formula (1) with m and n therein being 2 and 3, respectively, or the modifier comprises a modifier represented by the formula (2) with each of m, n, and l therein being 3.

[12]

The method for producing the modified conjugated diene-based polymer according to any of [9] to [11], wherein the organolithium compound comprises an organolithium compound represented by any of following general formulas (14) to (17):

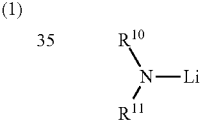
(14)

wherein $R^{10}$ and $R^{11}$ each independently denote at least one selected from the group consisting of an alkyl group having 1 to 12 carbon atoms, a cycloalkyl group having 3 to 14 carbon atoms, and an aralkyl group having 6 to 20 carbon atoms; $R^{10}$ and $R^{11}$ may be attached together to form a cyclic structure together with an adjacent nitrogen atom, and in this case, $R^{10}$ and $R^{11}$ denote an alkyl group having 5 to 12 carbon atoms, and may have an unsaturated bond or a branched structure in a part thereof;

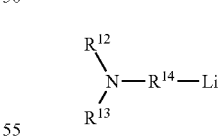
(15)

wherein $R^{12}$ and $R^{13}$ each independently denote at least one selected from the group consisting of an alkyl group having 1 to 12 carbon atoms, a cycloalkyl group having 3 to 14 carbon atoms, and an aralkyl group having 6 to 20 carbon atoms; $R^{12}$ and $R^{13}$ may be attached together to form a cyclic structure together with an adjacent nitrogen atom, and in this case, $R^{12}$ and $R^{13}$ denote an alkyl group having 5 to 12 carbon atoms, and may have an unsaturated bond or a branched structure in a part thereof; and $R^{14}$ denotes an alkylene group having 1 to 20 carbon atoms or a conjugated diene-based polymer having 1 to 20 carbon atoms;

(16)

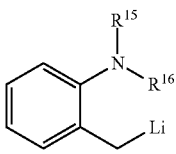

wherein $R^{15}$ and $R^{16}$ each independently denote at least one selected from the group consisting of an alkyl group having 1 to 12 carbon atoms, a cycloalkyl group having 3 to 14 carbon atoms, and an aryl group having 6 to 20 carbon atoms; $R^{15}$ and $R^{16}$ may be attached together to form a cyclic structure together with an adjacent nitrogen atom, and in this case, $R^{15}$ and $R^{16}$ denote an alkyl group having 5 to 12 carbon atoms, and may have a branched structure in a part thereof;

(17)

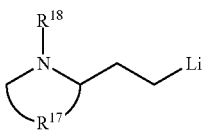

wherein $R^{17}$ denotes a hydrocarbon group having 2 to 10 carbon atoms, and may have an unsaturated bond or a branched structure in a part thereof; and $R^{18}$ denotes an alkyl group having 1 to 12 carbon atoms, and may have a branched structure in a part thereof.

[13]

The method for producing the modified conjugated diene-based polymer according to any of [9] to [12], wherein, in the polymerization step, polymerization is performed in a continuous type, a polymerization temperature is 45° C. or more and 80° C. or less, and a solid content is 16% by mass or less.

[14]

The method for producing the modified conjugated diene-based polymer according to any of [9] to [13], wherein, in the polymerization step, polymerization is performed in a continuous type, and a concentration of the organolithium compound is 0.010 mol/L or less based on a volume of a hydrocarbon solvent.

[15]

The method for producing the modified conjugated diene-based polymer according to any of [9] to [14], wherein, in the modification step, a content of the conjugated diene compound is 100 ppm by mass or more and 50000 ppm by mass or less based on a total amount of a monomer and a polymer.

[16]

A modified conjugated diene-based polymer obtained through the method for producing the modified conjugated diene-based polymer according to any of [9] to [15].

[17]

A modified conjugated diene-based polymer composition comprising:

a rubber component and 0.5 parts by mass or more and 300 parts by mass or less of a silica-based inorganic filler based on 100 parts by mass of the rubber component, wherein the rubber component comprises 20 parts by mass or more of the modified conjugated diene-based polymer according to any of [1] to [8] and [16] based on 100 parts by mass of the rubber component.

Advantageous Effects of Invention

The modified conjugated diene-based polymer according to the present invention can achieve excellence in processability during conversion into a vulcanizate, and excellence in balance between low hysteresis loss and wet skid resistance, and excellence in fracture strength and abrasion resistance after conversion into a vulcanizate.

DESCRIPTION OF EMBODIMENTS

Now, embodiments of the present invention (hereinafter, referred to as "the present embodiments") will be described in detail. The present embodiments below are examples for describing the present invention, and are not intended to limit the present invention to the contents below. The present invention may be implemented with an appropriate modification without departing from the gist.

[Modified Conjugated Diene-Based Polymer]

In a modified conjugated diene-based polymer according to the present embodiments, the Mooney stress-relaxation rate measured at 110° C. (hereinafter, also referred to as "Mooney stress-relaxation rate" or "MSR", simply) is 0.45 or less, and the modification percentage is 75% by mass or more.

The Mooney stress-relaxation rate measured for a modified conjugated diene-based polymer at 110° C. serves as an indicator of the branched structure and molecular weight of the modified conjugated diene copolymer. The Mooney stress-relaxation rate measured for the modified conjugated diene-based polymer at 110° C. is 0.45 or less, preferably 0.42 or less, more preferably 0.40 or less, further preferably 0.38 or less, and furthermore preferably 0.35 or less. The lower limit of the Mooney stress-relaxation rate is not particularly limited, and may be lower than or equal to a detection limit. However, the Mooney stress-relaxation rate is preferably 0.05 or more. The Mooney stress-relaxation rate of 0.45 or less allows exertion of the advantageous effects of the present embodiments.

The MSR measured for a modified conjugated diene-based polymer at 110° C. serves as an indicator of the molecular weight and number of branches of the modified conjugated diene-based polymer. As the MSR becomes lower, for example, the molecular weight and number of branches of the modified conjugated diene-based polymer (e.g., the number of branches of star-shaped polymer (also referred to as "the number of arms of star-shaped polymer")) tend to become higher or larger. Since the MSR becomes lower as the number of branches of a modified conjugated diene-based polymer becomes larger, the MSR can be used as an indicator of the degree of branching when modified conjugated diene-based polymers having the same Mooney viscosity, which will be described later, are compared.

The MSR is measured with a Mooney viscometer as follows. The temperature for measurement of the Mooney stress-relaxation rate is set at 110° C. First, a sample is pre-heated for 1 minute, and then the rotor is rotated at 2 rpm, and the torque is measured after 4 minutes therefrom, and the measured value is defined as Mooney viscosity (ML(1+4)). Thereafter, the rotation of the rotor is immediately suspended, the torque in Mooney units is recorded every 0.1 seconds from 1.6 seconds to 5 seconds after the suspension to prepare a double logarithmical plot of torque versus time (sec), from which the slope of the line is calculated, and the absolute value of the slope is defined as the Mooney stress-relaxation rate (MSR). More specifically, the MSR is measured in accordance with a method described later in Examples.

For example, the weight-average molecular weight and degree of branching of a modified conjugated diene-based polymer are suitably set to 700000 or more and 3 or more, respectively, or set to 650000 or more and 4 or more, respectively with the result that a Mooney stress-relaxation rate of 0.45 or less tends to be achieved. For example, the weight-average molecular weight and degree of branching of a modified conjugated diene-based polymer are suitably set to 750000 or more and 3 or more, respectively, or set to 700000 or more and 4 or more, respectively with the result that a Mooney stress-relaxation rate of 0.40 or less tends to be achieved. The degree of branching can be controlled, for example, via the number of functional groups of a modifier, the amount of a modifier to be added, or the degree of progression of metalation.

The Mooney viscosity measured for the modified conjugated diene copolymer according to the present embodiments at 110° C. is preferably 100 or more and 200 or less, more preferably 110 or more and 180 or less, and further preferably 120 or more and 160 or less, from the viewpoint of processability during conversion into a vulcanizate and abrasion resistance after conversion into a vulcanizate. The Mooney viscosity is measured in accordance with a method described later in Examples.

In the modified conjugated diene-based polymer according to the present embodiments, the Mooney stress-relaxation rate is 0.45 or less and the modification percentage is 75% by mass or more. More preferably, the Mooney stress-relaxation rate is 0.45 or less and the modification percentage is 78% by mass or more, further preferably, the Mooney stress-relaxation rate is 0.44 or less and the modification percentage is 80% by mass or more, furthermore preferably, the Mooney stress-relaxation rate is 0.43 or less and the modification percentage is 85% by mass or more, still furthermore preferably, the Mooney stress-relaxation rate is 0.42 or less and the modification percentage is 88% by mass or more, and particularly preferably, the Mooney stress-relaxation rate is 0.40 or less and the modification percentage is 90% by mass or more.

Examples of methods for obtaining a modified conjugated diene-based polymer having a Mooney stress-relaxation rate of 0.45 or less and a modification percentage of 75% by mass or more include a method in which polymerization is performed with an organolithium compound having at least one nitrogen atom in the molecule as a polymerization initiator, and then the product is further modified with a modifier to impart a particular branching ratio. When polymerization is simply performed with an organolithium compound having at least one nitrogen atom in the molecule as a polymerization initiator, however, chain transfer reaction is promoted to generate a low-molecular-weight product with its active polymer terminal deactivated, resulting in a lower modification percentage. Accordingly, only using a polymerization initiator and a modifier to impart a particular branching ratio tends to fail to provide a modified conjugated diene-based polymer having a modification percentage of 75% by mass or more and an MSR of 0.45 or less. Thus, a modified conjugated diene-based polymer having a modification percentage of 75% by mass or more and an MSR of 0.45 or more can be obtained by controlling each kind of polymerization conditions so as not to excessively promote the chain transfer reaction. The means for controlling polymerization conditions will be described later in Examples with regard to a production method.

It is preferred to produce a modified conjugated diene-based polymer so that the modification percentage (the content of a polymer having a particular functional group (e.g., a polymer having a nitrogen atom at the terminal of initiation of polymerization and/or a modified conjugated diene-based polymer modified with a modifier represented by a formula (1) or (2) described later) reaches 75% by mass or more, preferably 78% by mass or more, more preferably 80% by mass or more, further preferably 85% by mass or more, furthermore preferably 88% by mass or more, and still furthermore preferably 90% by mass or more, from the viewpoint of more successful achievement of the advantageous effects of the present embodiments. The modification percentage can be measured with chromatography allowing separation between modified components containing a functional group and unmodified components. Examples of methods with such chromatography include a method in which a column for gel permeation chromatography including a packing material of a polar substance capable of adsorbing a particular functional group thereon, such as silica, is used, and quantification is performed by using a non-adsorbable component as an internal standard for comparison. For measurement of the modification percentage, more specifically, a chromatogram is acquired from a sample solution containing a sample and low-molecular-weight polystyrene as an internal standard by using a polystyrene gel column, and a chromatogram is acquired from the sample solution by using a silica column, and the amount of adsorption in the silica column is determined from the difference between these chromatograms. More specifically, the modification percentage is measured in accordance with a method described later in Examples.

The modification percentage of 75% by mass or more tends to be obtained by controlling the amount of a modifier to be added and the reaction thereof, and for example, polymerization is performed by using an organolithium compound having at least one nitrogen atom in the molecule, which will be described later, as a polymerization initiator.

It is preferred that the modified conjugated diene-based polymer according to the present embodiments have a nitrogen atom and the content of the nitrogen atom measured in oxidative combustion-chemiluminescence (JIS-2609: Crude petroleum and petroleum products—Determination of nitrogen content) (hereinafter, also referred to as "nitrogen content", simply) be 25 ppm by mass or more based on the total amount of the modified conjugated diene-based polymer.

From the viewpoint that the advantageous effects of the present embodiments are exerted in a better manner, the nitrogen content of the modified conjugated diene-based polymer is preferably 25 ppm by mass or more, more preferably 40 ppm by mass or more, further preferably 50 ppm by mass or more, furthermore preferably 60 ppm by mass or more and preferably 500 ppm by mass or less, more preferably 400 ppm by mass or less, further preferably 300 ppm by mass or less, furthermore preferably 250 ppm by mass or less, based on the total amount of the modified conjugated diene-based polymer. More specifically, the content of the nitrogen atom is measured in accordance with a method described later in Examples.

Examples of methods for obtaining a modified conjugated diene-based polymer having a nitrogen content of 25 ppm by mass or more include a method in which continuous polymerization is performed by using an organolithium compound having at least one nitrogen atom in the molecule as a polymerization initiator to produce a conjugated diene-based polymer, and the conjugated diene-based polymer is then reacted with a modifier having at least one nitrogen atom in the molecule. Examples of methods for obtaining a modified conjugated diene-based polymer having a nitrogen content of 500 ppm by mass or less include a method in which polymerization is performed to produce a conjugated diene-based polymer having a number-average molecular weight of 100000 or less concomitantly with modification of the conjugated diene-based polymer by using combination of a polymerization initiator of an organolithium compound having at least one nitrogen atom in the molecule and a modifier having at least one nitrogen atom in the molecule.

In the modified conjugated diene-based polymer according to the present embodiments, the shrinkage factor (g') determined by gel permeation chromatography (GPC)-light scattering measurement with a viscosity detector (hereinafter, also referred to as "shrinkage factor (g')" or "shrinkage factor", simply) is preferably 0.86 or less.

The shrinkage factor (g') serves as an indicator of the branched structure of the modified conjugated diene copolymer. The shrinkage factor (g') of the modified conjugated diene-based polymer is preferably 0.86 or less, more preferably 0.81 or less, and further preferably 0.77 or less. The lower limit of the shrinkage factor (g') is not particularly limited, and may be lower than or equal to a detection limit. However, the shrinkage factor is preferably 0.02 or more. The shrinkage factor (g') of 0.81 or less allows exertion of the advantageous effects of the present embodiments in a more reliable manner.

Examples of methods for obtaining a modified conjugated diene-based polymer having a shrinkage factor (g') of 0.86 or less include a method of adding a modifier having four or more reactive points for a living, active terminal in moles of ⅓ or less of the total moles of a polymerization initiator, that is, obtaining a modified conjugated diene copolymer having three or more branches.

The shrinkage factor (g') measured in GPC-light scattering measurement with a viscosity detector (hereinafter, also referred to as "GPC-light scattering measurement with a viscosity detector" or "3D-GPC measurement", simply) serves also as an indicator of the number of branches of the modified conjugated diene-based polymer. As the above shrinkage factor (g') becomes lower, for example, the number of branches of the modified conjugated diene-based polymer (e.g., the number of branches of star-shaped polymer ((also referred to as "the number of arms of star-shaped polymer")) tends to become larger. Since the shrinkage factor (g') becomes lower as the number of branches of a modified conjugated diene-based polymer becomes larger, the shrinkage factor (g') can be used as an indicator of the degree of branching when modified conjugated diene-based polymers equivalent in absolute molecular weight are compared.

The shrinkage factor (g') is measured by using 3D-GPC measurement. Assuming that the constants (K, α) in the relation between intrinsic viscosity and molecular weight ($[\eta]=KM\alpha$ ($[\eta]$: intrinsic viscosity, M: molecular weight)) satisfy log K=−3.883 and α=0.771, data are input in the range of molecular weight M of 1000 to 20000000 to prepare the relation between reference intrinsic viscosity $[\eta]_0$ and molecular weight M. The relation between the intrinsic viscosity $[\eta]$, which is acquired from a sample in 3D-GPC measurement at each molecular weight M, and the reference intrinsic viscosity $[\eta]_0$, $[\eta]/[\eta]_0$, is calculated at each molecular weight M, and the average value is used as the shrinkage factor (g'). More specifically, the shrinkage factor is measured in accordance with a method described later in Examples.

It is preferred that the modified conjugated diene-based polymer have a nitrogen atom at one or more terminal, and have a star-shaped polymer structure including a nitrogen-containing alkoxysilane substituent positioned at a center thereof. To allow a modified conjugated diene-based polymer to have a nitrogen atom at one or more least one terminal, For example, a polymerization initiator comprising nitrogen is suitably used in a polymerization step described later with regard to a production method with the result that a modified conjugated diene-based polymer to have a nitrogen atom at one or more terminal tends to be obtained. In addition, the nitrogen-containing alkoxysilane preferably has a structure derived from a modifier. The "star-shaped polymer structure" as used herein refers to a structure in which a plurality of linear molecular chains (arms) is bonding to a single branching point. Here, to the single branching point, a linear molecular chain at least containing a nitrogen atom and a linear molecular chain containing an alkoxysilane group are bonding.

In the modified conjugated diene-based polymer according to the present embodiments, the ratio of the second number-average molecular weight (Mn-i) determined by gel permeation chromatography (GPC)-light scattering measurement to the first number-average molecular weight (Mn) in terms of polystyrene determined by measurement with GPC is preferably 1.00 or more, more preferably 1.20 or more, and further preferably 1.30 or more.

First number-average molecular weight is number-average molecular weight in terms of resulting polystyrene determined by measurement with gel permeation chromatography (GPC), and is relative molecular weight. Relative molecular weight is affected by the radius of rotation of a polymer under measurement. On the other hand, second number-average molecular weight is number-average molecular weight measured in GPC-light scattering measurement, and is absolute molecular weight. Absolute molecular weight is not affected by the radius of rotation of a polymer. Accordingly, the ratio of second number-average molecular weight to first number-average molecular weight, (Mn-i/Mn), serves as an indicator of the branched structure and molecular weight of a polymer. Specifically, the case that (Mn-i/Mn) is 1.00 or more indicates a high molecular weight and a structure having a branched structure. Although the upper limit of (Mn-i/Mn) is not particularly limited, (Mn-i/Mn) is preferably 3.00 or less.

The configuration in which (Mn-i/Mn) is 1.00 or more can provide a modified conjugated diene-based polymer to be obtained with an improved degree of branching derived from the star-shaped polymer. To obtain a modified conjugated diene-based polymer in which (Mn-i/Mn) is 1.00 or more, for example, a modified conjugated diene-based polymer having three or more branches and a first number-average molecular weight of 300000 or more is suitably produced, and more suitably a modified conjugated diene-based polymer having four or more branches and a first number-average molecular weight of 320000 or more is produced.

In the modified conjugated diene-based polymer according to the present embodiments, the ratio of the second weight-average molecular weight (Mw-i) measured in gel permeation chromatography (GPC)-light scattering measurement to the first weight-average molecular weight (Mw) in terms of polystyrene determined by measurement with GPC is preferably 1.00 or more, more preferably 1.02 or more, and further preferably 1.05 or more.

First weight-average molecular weight is weight-average molecular weight in terms of resulting polystyrene determined by measurement with gel permeation chromatography (GPC), and is relative molecular weight. Relative molecular weight is affected by the radius of rotation of a polymer under measurement. On the other hand, second weight-average molecular weight is weight-average molecular weight determined by GPC-light scattering measurement, and is absolute molecular weight. Absolute molecular weight is not affected by the radius of rotation of a polymer. Accordingly, the ratio of second weight-average molecular weight to first weight-average molecular weight, (Mw-i/Mw), serves as an indicator of the branched structure and molecular weight of a polymer. Specifically, the case that (Mw-i/Mw) is 1.00 or more indicates a high molecular weight and a structure having a branched structure. Although the upper limit of (Mw-i/Mw) is not particularly limited, (Mw-i/Mw) is preferably 2.00 or less.

(Mw-i/Mw) is 1.00 or more with the result that a modification percentage of a modified conjugated diene-based polymer to be obtained tends to be improved. For example, a modified conjugated diene polymer produced so as to have three or more branches and a first number-average molecular weight of 600000 or more tends to have (Mw-i/Mw) of 1.00 or more.

Measurement with gel permeation chromatography and GPC-light scattering measurement are performed in accordance with methods described later in Examples.

In the modified conjugated diene-based polymer according to the present embodiments, the first number-average molecular weight (Mn) is preferably 200000 or more and 2000000 or less, more preferably 250000 or more and 1500000 or less, and further preferably 300000 or more and 1000000 or less, from the viewpoint of balance between performance and processing characteristics. The first number-average molecular weight is higher than or equal to such a lower limit with the result that strength after conversion into a vulcanizate tends to be further improved. The first number-average molecular weight is lower than or equal to such an upper limit with the result that processability tends to be further improved. In the modified conjugated diene-based polymer according to the present embodiments, the first weight-average molecular weight is preferably 400000 or more and 4000000 or less, more preferably 500000 or more and 3000000 or less, and further preferably 600000 or more and 2000000 or less, from the viewpoint of balance between performance and processability.

In the modified conjugated diene-based polymer according to the present embodiments, the ratio of the first weight-average molecular weight (Mw) to the first number-average molecular weight (Mn), (Mw/Mn), is preferably 1.00 or more and 3.50 or less, more preferably 1.50 or more and 3.40 or less, further preferably 1.60 or more and 2.70 or less, and furthermore preferably 1.70 or more and 2.50 or less, from the viewpoint of the physical properties of a vulcanizate. It is more preferred that the first number-average molecular weight (Mn) be 200000 or more and 2000000 or less and (Mw/Mn) be 1.50 or more and 3.50 or less.

The modified conjugated diene-based polymer according to the present embodiments is preferably a modified conjugated diene-based polymer represented by the following general formula (A) or (B).

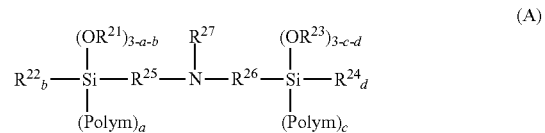

(A)

In the formula (A), $R^{21}$ to $R^{24}$ each independently denote an alkyl group having 1 to 20 carbon atoms or an aryl group having 6 to 20 carbon atoms; $R^{25}$ and $R^{26}$ each independently denote an alkylene group having 1 to 20 carbon atoms; $R^{27}$ denotes a hydrogen atom, a silyl group substituted with a hydrocarbon, an alkyl group having 1 to 20 carbon atoms, or an aryl group having 6 to 20 carbon atoms; a and c each independently denote an integer of 1 or 2; b and d each independently denote an integer of 0 or 1; (a+b) and (c+d) each independently denote an integer of 2 or less; (Polym) denotes a conjugated diene-based polymer derived by polymerization of a conjugated diene compound or copolymerization of a conjugated diene compound and an aromatic vinyl compound, wherein at least one terminal thereof is a functional group represented by any of general formulas (4) to (7) below; in the case that a plurality of moieties is present as $R^{21}$ or $R^{23}$, they are independent of each other; and the moieties (Polym) are independent of each other. Examples of the above-described star-shaped polymer structure which the modified conjugated diene-based polymer may have comprise a structure of the modified conjugated diene-based polymer represented by the formula (A) in which the Si atom bonding to $R^{25}$ serves as a branching point to which $R^{25}$, $(OR^{21})_{3-a-b}$, $R^{22}_b$, and $(Polym)_a$ as linear molecular chains (arms) are bonding.

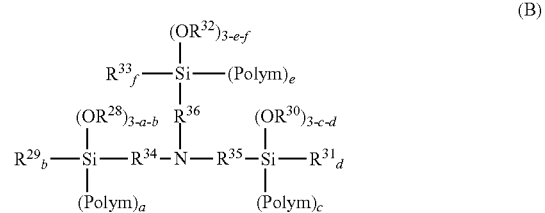

(B)

In the formula (B), $R^{28}$ to $R^{33}$ each independently denote an alkyl group having 1 to 20 carbon atoms or an aryl group having 6 to 20 carbon atoms; $R^{34}$ to $R^{36}$ each independently denote an alkylene group having 1 to 20 carbon atoms; a, c, and e each independently denote an integer of 1 or 2; b, d, and f each independently denote an integer of 0 or 1; (a+b), (c+d), and (e+f) each independently denote an integer of 2 or less; (Polym) denotes a conjugated diene-based polymer derived by polymerization of a conjugated diene compound or copolymerization of a conjugated diene compound and an aromatic vinyl compound, wherein at least one terminal thereof is a functional group represented by any of general formulas (4) to (7) below; in the case that a plurality of moieties is present as $R^{28}$, $R^{30}$, or $R^{32}$, they are independent of each other; and the moieties (Polym) are independent of each other. Examples of the above-described star-shaped polymer structure which the modified conjugated diene-based polymer may have comprise a structure of the modified conjugated diene-based polymer represented by the formula (B) in which the Si atom bonding to $R^{34}$ serves as a branching point to which $R^{34}$, $(OR^{28})^{3-a-b}$, $R^{29}_b$, and $(Polym)_a$ as linear molecular chains (arms) are bonding.

(4)

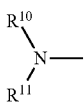

In the formula (4), $R^{10}$ and $R^{11}$ each independently denote at least one selected from the group consisting of an alkyl group having 1 to 12 carbon atoms, a cycloalkyl group having 3 to 14 carbon atoms, and an aralkyl group having 6 to 20 carbon atoms; $R^{10}$ and $R^{11}$ may be attached together to form a cyclic structure together with an adjacent nitrogen atom, and in this case, $R^{10}$ and $R^{11}$ denote an alkyl group having 5 to 12 carbon atoms, and may have an unsaturated bond or a branched structure in a part thereof.

(5)

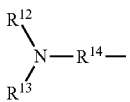

In the formula (5), $R^{12}$ and $R^{13}$ each independently denote at least one selected from the group consisting of an alkyl group having 1 to 12 carbon atoms, a cycloalkyl group having 3 to 14 carbon atoms, and an aralkyl group having 6 to 20 carbon atoms; $R^{12}$ and $R^{13}$ may be attached together to form a cyclic structure together with an adjacent nitrogen atom, and in this case, $R^{12}$ and $R^{13}$ denote an alkyl group having 5 to 12 carbon atoms, and may have an unsaturated bond or a branched structure in a part thereof; and $R^{14}$ denotes an alkylene group having 1 to 20 carbon atoms or a conjugated diene-based polymer having 1 to 20 carbon atoms.

(6)

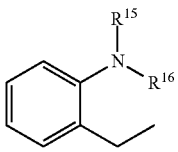

In the formula (6), $R^{15}$ and $R^{16}$ each independently denote at least one selected from the group consisting of an alkyl group having 1 to 12 carbon atoms, a cycloalkyl group having 3 to 14 carbon atoms, and an aryl group having 6 to 20 carbon atoms; and $R^{15}$ and $R^{16}$ may be attached together to form a cyclic structure together with an adjacent nitrogen atom, and in this case, $R^{15}$ and $R^{16}$ denote an alkyl group having 5 to 12 carbon atoms, and may have a branched structure in a part thereof.

(7)

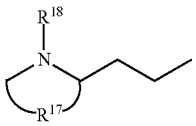

In the formula (7), $R^{17}$ denotes an alkyl group forming a cyclic structure together with the nitrogen atom, the cyclic structure having 2 to 12 carbon atoms in total, and may have an unsaturated bond or a branched structure in a part thereof; and $R^{18}$ denotes an alkyl group having 1 to 12 carbon atoms, and may have a branched structure in a part thereof.

In the formula (A), it is preferred that $R^{21}$ to $R^{24}$ be each independently an alkyl group having one to eight carbon atoms, and it is more preferred that $R^{21}$ to $R^{24}$ be each independently an alkyl group having one to four carbon atoms. It is preferred that $R^{25}$ and $R^{26}$ be each independently an alkylene group having one to eight carbon atoms, and it is more preferred that $R^{25}$ and $R^{26}$ be each independently an alkylene group having two to four carbon atoms. It is preferred that $R^{27}$ be a hydrogen atom or an alkyl group having zero to six carbon atoms, and it is more preferred that $R^{27}$ be a hydrogen atom. Examples of the moieties $R^{21}$ to $R^{24}$ include, but not limited to, a methyl group, an ethyl group, a propyl group, a butyl group, and an isobutyl group, and preferred are a methyl group and an ethyl group. Examples of the moieties $R^{25}$ and $R^{26}$ include a methylene group, an ethylene group, a propylene group, a butylene group, and a pentylene group, and preferred are an ethylene group, a propylene group, and a butylene group. Examples of the moiety $R^{27}$ include a hydrogen atom, a methyl group, an ethyl group, a propyl group, a butyl group, and an isobutyl group, and preferred are a hydrogen atom, a methyl group, and an ethyl group.

The number-average molecular weight of (Polym) in the formula (A) is not particularly limited. However, the number-average molecular weight of (Polym) in the formula (A) is preferably 250000 or more and 1500000 or less, and more preferably 350000 or more and 900000 or less.

In the formula (B), it is preferred that $R^{28}$ to $R^{33}$ be each independently an alkyl group having one to eight carbon atoms, and it is more preferred that $R^{28}$ to $R^{33}$ be each independently an alkyl group having one to four carbon atoms. It is preferred that $R^{34}$ to $R^{36}$ be each independently an alkylene group having one to eight carbon atoms, and it is more preferred that $R^{34}$ to $R^{36}$ be each independently an alkylene group having two to four carbon atoms. Examples of the moieties $R^{28}$ to $R^{33}$ include a methyl group, an ethyl group, a propyl group, a butyl group, and an isobutyl group, and preferred are a methyl group and an ethyl group. Examples of the moieties $R^{34}$ to $R^{36}$ include a methylene group, an ethylene group, a propylene group, a butylene group, and a pentylene group, and preferred are an ethylene group, a propylene group, and a butylene group.

The number-average molecular weight of (Polym) in the formula (B) is not particularly limited. However, the number-average molecular weight of (Polym) in the formula (B) is preferably 250000 or more and 1500000 or less, and more preferably 350000 or more and 900000 or less.

In the formula (4), in the case that $R^{10}$ and $R^{11}$ are each an alkyl group, it is preferred that $R^{10}$ and $R^{11}$ be each an alkyl group having one to six carbon atoms. In the case that $R^{10}$ and $R^{11}$ are each a cycloalkyl group, it is preferred that $R^{10}$ and $R^{11}$ be each a cycloalkyl group having five to seven carbon atoms. In the case that $R^{10}$ and $R^{11}$ are each an aralkyl group, it is preferred that $R^{10}$ and $R^{11}$ be each an aralkyl group having six to eight carbon atoms. In the case that $R^{10}$ and $R^{11}$ are bonding together to form a cyclic structure together with an adjacent nitrogen atom, it is preferred that $R^{10}$ and $R^{11}$ form an alkyl group having five to seven carbon atoms. Examples of the moieties $R^{10}$ and $R^{11}$ include, but not limited to, a methyl group, an ethyl group, a propyl group, a butyl group, and an isobutyl group, and preferred are a butyl group and an isobutyl group. Examples of the moiety which $R^{10}$ and $R^{11}$ form in the case that $R^{10}$ and $R^{11}$ are bonding together to form a cyclic structure together with an adjacent nitrogen atom include, but not limited to, a methylene group, an ethylene group, a propylene group, a butylene group, a pentylene group, and a hexylene group, and preferred are a butylene group, a pentylene group, and a hexylene group.

In the formula (5), in the case that $R^{12}$ and $R^{13}$ are bonding together to form a cyclic structure together with an adjacent nitrogen atom, it is preferred that $R^{12}$ and $R^{13}$ form an alkyl group having one to eight carbon atoms. Examples of the moieties $R^{12}$ and $R^{13}$ include, but not limited to, a methyl group, an ethyl group, a propyl group, a butyl group, and an isobutyl group, and preferred are a butyl group and an isobutyl group. Examples of the moiety which $R^{12}$ and $R^{13}$ form in the case that $R^{12}$ and $R^{13}$ are bonding together to form a cyclic structure together with an adjacent nitrogen atom include, but not limited to, a methylene group, an ethylene group, a propylene group, a butylene group, a pentylene group, and a hexylene group, and preferred are a butylene group, a pentylene group, and a hexylene group.

In the formula (5), it is preferred that $R^{14}$ be an alkylene group having one to eight carbon atoms. Examples of the moiety $R^{14}$ include, but not limited to, a methylene group, an ethylene group, a propylene group, a butylene group, a pentylene group, and a hexylene group, and preferred are an ethylene group, a propylene group, and a butylene group.

In the formula (6), examples of the moieties $R^{15}$ and $R^{16}$ include, but not limited to, a methyl group, an ethyl group, a propyl group, a butyl group, and an isobutyl group, and preferred are a methyl group and an ethyl group.

In the formula (7), it is preferred that $R^{17}$ form an alkyl group having four to six carbon atoms in total. It is preferred that $R^{18}$ be an alkyl group having one to four carbon atoms. Examples of the moiety which $R^{17}$ forms include, but not limited to, a butylene group, a pentylene group, and a hexylene group, and preferred are a pentylene group and a hexylene group. Examples of the moiety $R^{18}$ include, but not limited to, a methyl group, an ethyl group, a propyl group, a butyl group, and an isobutyl group, and preferred are a methyl group and an ethyl group.

[Method for Producing Modified Conjugated Diene-Based Polymer]

The modified conjugated diene-based polymer according to the present embodiments can be obtained through a method for producing a modified conjugated diene-based polymer, the method comprising steps of: polymerizing at least a conjugated diene compound by using an organolithium compound having at least one nitrogen atom in the molecule as a polymerization initiator to obtain a conjugated diene-based polymer; and modifying the conjugated diene-based polymer with a modifier having four or more alkoxy groups bonding to a silyl group and a tertiary amino group in one molecule. The conjugated diene-based polymer constituting the modified conjugated diene-based polymer is a homopolymer of a single conjugated diene compound, a polymer of different conjugated diene compounds, i.e., a copolymer of different kind of conjugated diene compounds, or a copolymer of a conjugated diene compound and an aromatic vinyl compound.

[Polymerization Step]

In the polymerization step in the present embodiments, at least a conjugated diene compound is polymerized in the presence of an organolithium compound having at least one nitrogen atom in the molecule to obtain a conjugated diene-based polymer.

<Polymerization Initiator>

For the polymerization initiator in the present embodiments, a polymerization initiator system including an organolithium compound having at least one nitrogen atom in the molecule, or a polymerization initiator system including a compound having at least one nitrogen atom in the molecule and an organolithium compound can be used. For preparing such a polymerization initiator system, an organolithium compound having at least one nitrogen atom in the molecule may be prepared in advance in a given reactor, or a compound having at least one nitrogen atom in the molecule and an organic lithium may be fed into a reactor for performing polymerization or copolymerization, which will be described later, and reacted together concomitantly with or prior to polymerization or copolymerization.

For the compound having at least one nitrogen atom in the molecule to be used for the polymerization initiator system in the present embodiments, a compound represented by any of the following general formulas (24) to (26) can be used.

(24)

In the formula (24), $R^{10}$ and $R^{11}$ each independently denote at least one selected from the group consisting of an alkyl group having 1 to 12 carbon atoms, a cycloalkyl group having 3 to 14 carbon atoms, and an aralkyl group having 6 to 20 carbon atoms; $R^{10}$ and $R^{11}$ may be attached together to form a cyclic structure together with an adjacent nitrogen atom, and in this case, $R^{10}$ and $R^{11}$ denote an alkyl group having 5 to 12 carbon atoms, and may have an unsaturated bond or a branched structure in a part thereof.

(25)

In the formula (25), $R^{12}$ and $R^{13}$ each independently denote at least one selected from the group consisting of an alkyl group having 1 to 12 carbon atoms, a cycloalkyl group having 3 to 14 carbon atoms, and an aralkyl group having 6 to 20 carbon atoms; $R^{12}$ and $R^{13}$ may be attached together to form a cyclic structure together with an adjacent nitrogen atom, and in this case, $R^{12}$ and $R^{13}$ denote an alkyl group having 5 to 12 carbon atoms, and may have an unsaturated bond or a branched structure in a part thereof; $R^{14}$ denotes an alkylene group having 1 to 20 carbon atoms or a conjugated diene-based polymer having 1 to 20 carbon atoms; and X denotes a Cl atom, a Br atom, or an I atom.

(26)

In the formula (26), $R^{15}$ and $R^{16}$ each independently denote at least one selected from the group consisting of an alkyl group having 1 to 12 carbon atoms, a cycloalkyl group having 3 to 14 carbon atoms, and an aryl group having 6 to 20 carbon atoms; $R^{15}$ and $R^{16}$ may be attached together to form a cyclic structure together with an adjacent nitrogen atom, and in this case, $R^{15}$ and $R^{16}$ denote an alkyl group having 5 to 12 carbon atoms, and may have a branched structure in a part thereof.

In the formula (24), examples of the moieties $R^{10}$ and $R^{11}$ include, but not limited to, a methyl group, an ethyl group, a propyl group, a butyl group, an octyl group, a cyclopropyl group, a cyclohexyl group, a 3-phenyl-1-propyl group, an isobutyl group, a decyl group, a heptyl group, and a phenyl group. Examples of compounds represented by the formula (24) include, but not limited to, dimethylamine, diethylamine, dibutylamine, dipropylamine, diheptylamine, dihexylamine, dioctylamine, di-2-ethylhexylamine, didecylamine, ethylpropylamine, ethylbutylamine, ethylbenzylamine, and methylphenethylamine. The compound represented by the formula (24) is not limited to such compounds, and includes any analogous compound thereof satisfying the above conditions. The compound represented by the formula (24) is preferably dibutylamine or dihexylamine, and more preferably dibutylamine, from the viewpoint of reduction of the hysteresis loss of a modified conjugated diene-based polymer composition described later, reduction of the unpleasant odor of a modified conjugated diene-based polymer described later, and control of chain transfer reaction described later.

Examples of compounds represented by the formula (24) in the case that $R^{10}$ and $R^{11}$ are bonding together to form a cyclic structure together with an adjacent nitrogen atom include piperidine, hexamethyleneimine, azacyclooctane, 1,3,3-trimethyl-6-azabicyclo[3.2.1]octane, 1,2,3,6-tetrahydropyridine, and 3,5-dimethylpiperidine. The compound represented by the formula (24) is not limited to such compounds, and includes any analogous compound thereof satisfying the above conditions. The compound represented by the formula (24) is preferably piperidine, hexamethyleneimine, azacyclooctane, 1,3,3-trimethyl-6-azabicyclo[3.2.1]octane, or 3,5-dimethylpiperidine, more preferably piperidine, hexamethyleneimine, or 3,5-dimethylpiperidine, and further preferably piperidine, from the viewpoint of reduction of the hysteresis loss of a modified conjugated diene-based polymer composition described later, reduction of the unpleasant odor of a modified conjugated diene-based polymer described later, and control of chain transfer reaction described later.

In the formula (25), it is preferred that $R^{14}$ be an alkyl group having 2 to 16 carbon atoms and it is more preferred that $R^{14}$ be an alkyl group having 3 to 10 carbon atoms, from the viewpoint of reactivity to and interaction with an inorganic filler such as carbon and silica. Examples of compounds represented by the formula (25) include, but not limited to, 3-chloro-dimethylpropan-1-amine, 3-chloro-diethylpropan-1-amine, 3-chloro-dibutylpropan-1-amine, 3-chloro-dipropylpropan-1-amine, 3-chloro-diheptylpropan-1-amine, 3-chloro-dihexylpropan-1-amine, 3-chloropropyl-ethylhexan-1-amine, 3-chloro-didecylpropan-1-amine, 3-chloro-ethylpropan-1-amine, 3-chloro-ethylbutan-1-amine, 3-chloro-ethylpropan-1-amine, benzyl-3-chloroethylpropan-1-amine, 3-chloro-ethylphenethylpropan-1-amine, 3-chloro-methylphenethylpropan-1-amine, 1-(3-chloropropyl)piperidine, 1-(3-chloropropyl)hexamethyleneimine, 1-(3-chloropropyl)azacyclooctane, 6-(3-chloropropyl)-1,3,3-trimethyl-6-azabicyclo[3.2.1]octane, 1-(3-chloropropyl)-1,2,3,6-tetrahydropyridine, 1-(3-bromopropyl)hexamethyleneimine, 1-(3-iodopropyl)hexamethyleneimine, 1-(3-chlorobutyl)hexamethyleneimine, 1-(3-chloropentyl)hexamethyleneimine, 1-(3-chlorohexyl) hexamethyleneimine, and 1-(3-chlorodecyl)hexamethyleneimine. The compound represented by the formula (25) is not limited to such compounds, and includes any analogous compound thereof satisfying the above conditions. The compound represented by the formula (25) is preferably 3-chloro-dibutylpropan-1-amine or 1-(3-chloropropyl)hexamethyleneimine, and more preferably 1-(3-chloropropyl) hexamethyleneimine, from the viewpoint of reactivity to and interaction with an inorganic filler such as carbon and silica.

In the formula (25), in the case that $R^{14}$ is a conjugated diene-based polymer having repeating units each represented by any of the following formulas (28) to (30), X is a hydrogen atom.

(28)

(29)

(30)

Examples of compounds represented by the formula (25) in the case that X is a hydrogen atom include, but not limited to, N,N-dimethyl-2-butenyl-1-amine, N,N-diethyl-2-butenyl-1-amine, N,N-dibutyl-2-butenyl-1-amine, N,N-dipropyl-2-butenyl-1-amine, N,N-diheptyl-2-butenyl-1-amine, N,N-dihexyl-2-butenyl-1-amine, N,N-dioctyl-2-butenyl-1-amine, N,N-(di-2-ethylhexyl)-2-butenyl-1-amine, N,N-didecyl-2-butenyl-1-amine, N, N-ethylpropyl-2-butenyl-1-amine, N,N-ethylbutyl-2-butenyl-1-amine, N,N-ethylbenzyl-2-butenyl-1-amine, N,N-methylphenethyl-2-butenyl-1-amine, N,N-dimethyl-2-methyl-2-butenyl-1-amine, N,N-diethyl-2-methyl-2-butenyl-1-amine, N,N-dibutyl-2-methyl-2-butenyl-1-amine, N,N-dipropyl-2-methyl-2-butenyl-1-amine, N,N-diheptyl-2-methyl-2-butenyl-1-amine, N,N-dihexyl-2-methyl-2-butenyl-1-amine, N,N-dimethyl-3-methyl-2-butenyl-1-amine, N,N-diethyl-3-methyl-2-butenyl-1-amine, N,N-dibutyl-3-methyl-2-butenyl-1-amine, N,N-dipropyl-3-methyl-2-butenyl-1-amine, N,N-diheptyl-3-methyl-2-butenyl-1-amine, N,N-dihexyl-3-methyl-2-butenyl-1-amine, 1-(2-butenyl)piperidine, 1-(2-butenyl)hexamethyleneimine, 1-(2-butenyl)azacyclooctane, 6-(2-butenyl)1,3,3-trimethyl-6-azabicyclo[3.2.1]octane, 1-(2-butenyl)-1,2,3,6-tetrahydropyridine, (2-methyl-2-butenyl) hexamethyleneimine, and (3-methyl-2-butenyl) hexamethyleneimine. The compound represented by the formula (25) is not limited to such compounds, and includes any analogous compound thereof satisfying the above conditions. The compound represented by the formula (25) is preferably N,N-dibutyl-2-butenyl-1-amine, 1-(2-butenyl)piperidine, or 1-(2-butenyl)hexamethyleneimine, more preferably 1-(2-butenyl) piperidine or 1-(2-butenyl)hexamethyleneimine, and further preferably 1-(2-butenyl)piperidine, from the viewpoint of reduction of the hysteresis loss of a modified conjugated diene-based polymer composition described later.

Examples of compounds represented by the formula (26) for the polymerization initiator include, but not limited to, N,N-dimethyl-o-toluidine, N,N-dimethyl-m-toluidine, N,N-dimethyl-p-toluidine, N,N-diethyl-o-toluidine, N,N-diethylm-toluidine, N,N-diethyl-p-toluidine, N,N-dipropyl-o-toluidine, N,N-dipropyl-m-toluidine, N,N-dipropyl-p-toluidine, N,N-dibutyl-o-toluidine, N,N-dibutyl-m-toluidine, N,N-dibutyl-p-toluidine, o-piperidinotoluene, p-piperidinotoluene, o-pyrrolidinotoluene, p-pyrrolidinotoluene, N,N,N',N'-tetramethyltoluylenediamine, N,N,N',N'-tetraethyltoluylenediamine, N,N,N',N'-tetrapropyltoluylenediamine, N,N-dimethylxylidine, N,N-diethylxylidine, N,N-dipropylxylidine, N,N-dimethylmesidine, N,N-diethylmesidine, (N,N-dimethylamino) toluylphenylmethylamine, 1-(N,N-dimethylamino)-2-methylnaphthalene, and 1-(N,N-dimethylamino)-2-methylanthracene. The compound represented by the formula (26) is not limited to such compounds, and includes any analogous compound thereof satisfying the above conditions. The compound represented by the formula (26) is preferably N,N-dimethyl-o-toluidine, from the viewpoint of reduction of the hysteresis loss of a modified conjugated diene-based polymer composition described later.

Examples of the organolithium compound include, but not limited to, n-butyllithium, sec-butyllithium, tert-butyllithium, n-propyllithium, and iso-propyllithium.

From the viewpoint of improvement of the modification percentage and fuel-saving performance, the organolithium compound in the present embodiments is preferably a compound having at least one nitrogen atom in the molecule and being applicable as a polymerization initiator for anionic polymerization and comprising an organolithium compound represented by any of the following general formulas (14) to (17).

(14)

In the formula (14), $R^{10}$ and $R^{11}$ each independently denote at least one selected from the group consisting of an alkyl group having 1 to 12 carbon atoms, a cycloalkyl group having 3 to 14 carbon atoms, and an aralkyl group having 6 to 20 carbon atoms; $R^{10}$ and $R^{11}$ may be attached together to form a cyclic structure together with an adjacent nitrogen atom, and in this case, $R^{10}$ and $R^{11}$ denote an alkyl group having 5 to 12 carbon atoms, and may have an unsaturated bond or a branched structure in a part thereof.

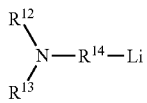

(15)

In the formula (15), $R^{12}$ and $R^{13}$ each independently denote at least one selected from the group consisting of an alkyl group having 1 to 12 carbon atoms, a cycloalkyl group having 3 to 14 carbon atoms, and an aralkyl group having 6 to 20 carbon atoms; $R^{12}$ and $R^{13}$ may be attached together to form a cyclic structure together with an adjacent nitrogen atom, and in this case, $R^{12}$ and $R^{13}$ denote an alkyl group having 5 to 12 carbon atoms, and may have an unsaturated bond or a branched structure in a part thereof; and $R^{14}$ denotes an alkylene group having 1 to 20 carbon atoms or a conjugated diene-based polymer having 1 to 20 carbon atoms.

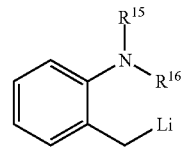

(16)

In the formula (16), $R^{15}$ and $R^{16}$ each independently denote at least one selected from the group consisting of an alkyl group having 1 to 12 carbon atoms, a cycloalkyl group having 3 to 14 carbon atoms, and an aryl group having 6 to 20 carbon atoms; and $R^{15}$ and $R^{16}$ may be attached together to form a cyclic structure together with an adjacent nitrogen atom, and in this case, $R^{15}$ and $R^{16}$ denote an alkyl group having 5 to 12 carbon atoms, and may have a branched structure in a part thereof.

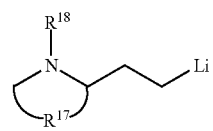

(17)

In the formula (17), $R^{17}$ denotes an alkyl group forming a cyclic structure together with the nitrogen atom, the cyclic structure having 2 to 12 carbon atoms in total, and may have an unsaturated bond or a branched structure in a part thereof; and $R^{18}$ denotes an alkyl group having 1 to 12 carbon atoms, and may have a branched structure in a part thereof.

In the formula (14), examples of the moieties $R^{10}$ and $R^{11}$ include a methyl group, an ethyl group, a propyl group, a butyl group, an octyl group, a benzyl group, a cyclopropyl group, a cyclohexyl group, a 3-phenyl-1-propyl group, an isobutyl group, a decyl group, a heptyl group, and a phenyl group. $R^{10}$ and $R^{11}$ are not limited to these compounds, and include any analogous compound thereof satisfying the above conditions. Each of $R^{10}$ and $R^{11}$ is preferably a butyl group or a hexyl group, and more preferably a butyl group, from the viewpoint of solubility in a solvent, reduction of the hysteresis loss of a modified conjugated diene-based polymer composition described later, and control of chain transfer reaction described later.

Examples of organolithium compounds represented by the formula (14) include, but not limited to, ethylpropylaminolithium, ethylbutylaminolithium, ethylbenzylaminolithium, dibutylaminolithium, and dihexylaminolithium. Among them, dibutylaminolithium and dihexylaminolithium are preferred, and dibutylaminolithium is more preferred.

Examples of organolithium compounds represented by the formula (14) in the case that $R^{10}$ and $R^{11}$ in the formula (14) are bonding together to form a cyclic structure together with an adjacent nitrogen atom include, but not limited to, piperidinolithium, hexamethyleneiminolithium, lithium azacyclooctane, lithium-1,3,3-trimethyl-6-azabicyclo[3.2.1]octane, 1,2,3,6-tetrahydropyridinolithium, and 3,5-dimethylpiperidinolithium. The organolithium compound is not limited to such compounds, and includes any analogous compound thereof satisfying the above conditions.

Preferred are piperidinolithium, hexamethyleneiminolithium, lithium azacyclooctane, and lithium-1,3,3-trimethyl-6-azabicyclo[3.2.1]octane, and more preferred are piperidinolithium, hexamethyleneiminolithium, and 3,5-dimethylpiperidinolithium, and further preferred is piperidinolithium, from the viewpoint of the solubility of a polymerization initiator in a solvent, reduction of the unpleasant odor of a modified conjugated diene-based polymer described later, and prevention of chain transfer reaction described later.

In the formula (15), $R^{14}$ denotes an alkylene group having 1 to 20 carbon atoms or a conjugated diene-based polymer having 1 to 20 carbon atoms. The conjugated diene-based polymer is preferably a conjugated diene-based polymer including repeating units each represented by any of the following formulas (18) to (20).

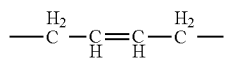
(18)

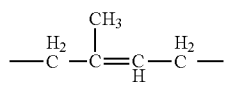
(19)

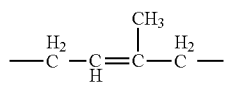
(20)

In the formula (15), in the case that $R^{14}$ is an alkylene group having 1 to 20 carbon atoms, it is preferred that $R^{14}$ be an alkylene group having 2 to 16 carbons and it is more preferred that $R^{14}$ be an alkylene group having 3 to 10 carbons, from the viewpoint of reactivity to and interaction with an inorganic filler such as carbon and silica. Examples of organolithium compounds represented by the formula (15) in the case that $R^{14}$ is an alkylene group having 1 to 20 carbon atoms include, but not limited to, (3-(dimethylamino)-propyl)lithium, (3-(diethylamino)-propyl)lithium, (3-(dipropylamino)-propyl)lithium, (3-(dibutylamino)-propyl)lithium, (3-(dipentylamino)-propyl)lithium, (3-(dihexylamino)-propyl)lithium, (3-(dioctylamino)-propyl)lithium, (3-(ethylhexylamino)-propyl)lithium, (3-(didecylamino)-propyl)lithium, (3-(ethylpropylamino-propyl)lithium, (3-(ethylbutylamino-propyl)lithium, (3-(ethylbenzylamino)-propyl)lithium, (3-(methylphenethylamino)-propyl)lithium, (4-(dibutylamino)-butyl)lithium, (5-(dibutylamino)-pentyl)lithium, (6-(dibutylamino)-hexyl)lithium, and (10-(dibutylamino)-decyl)lithium. The organolithium compound is not limited to such compounds, and includes any analogous compound thereof satisfying the above conditions. More preferred is (3-(dibutylamino)-propyl)lithium from the viewpoint of reactivity to and interaction with an inorganic filler such as carbon and silica.

Examples of organolithium compounds represented by the formula (15) in the case that $R^{14}$ in the formula (15) is a conjugated diene-based polymer including repeating units each represented by any of the formulas (18) to (20) include, but not limited to, (4-(dimethylamino)-2-butenyl)lithium, (4-(diethylamino)-2-butenyl)lithium, (4-(dibutylamino)-2-butenyl)lithium, (4-(dipropylamino)-2-butenyl)lithium, (4-(diheptylamino)-2-butenyl)lithium, (4-(dihexylamino)-2-butenyl)lithium, (4-(dioctylamino)-2-butenyl)lithium, (4-(di-2-ethylhexylamino)-2-butenyl)lithium, (4-(didecylamino)-2-butenyl)lithium, (4-(ethylpropylamino)-2-butenyl)lithium, (4-(ethylbutylamino)-2-butenyl)lithium, (4-(ethylbenzylamino)-2-butenyl)lithium, (4-(methylphenethylamino)-2-butenyl)lithium, (4-(dimethylamino)-2-methyl-2-butenyl)lithium, (4-(diethylamino)-2-methyl-2-butenyl)lithium, (4-(dibutylamino)-2-methyl-2-butenyl)lithium, (4-(dipropylamino)-2-methyl-2-butenyl)lithium, (4-(diheptylamino)-2-methyl-2-butenyl)lithium, (4-(dihexylamino)-2-methyl-2-butenyl)lithium, (4-(dimethylamino)-3-methyl-2-butenyl)lithium, (4-(diethylamino)-3-methyl-2-butenyl)lithium, (4-(dibutylamino)-3-methyl-2-butenyl)lithium, (4-(dipropylamino)-3-methyl-2-butenyl)lithium, (4-(diheptylamino)-3-methyl-2-butenyl)lithium, and (4-(dihexylamino)-3-methyl-2-butenyl)lithium. The organolithium compound is not limited to such compounds, and includes any analogous compound thereof satisfying the above conditions. Preferred are (4-(dimethylamino)-2-butenyl)lithium, (4-(diethylamino)-2-butenyl)lithium, and (4-(dibutylamino)-2-butenyl)lithium, and more preferred is (4-(dibutylamino)-2-butenyl)lithium, from the viewpoint of reactivity as an initiator and control of chain transfer reaction described later.

Examples of organolithium compounds represented by the formula (15) in the case that $R^{12}$ and $R^{13}$ in the formula (15) are bonding together to form a cyclic structure together with an adjacent nitrogen atom include (3-(piperidinyl) propyl)lithium, (3-(hexamethyleneiminyl)propyl) lithium, (3-(heptamethyleneiminyl)propyl) lithium, (3-(octamethyleneiminyl)propyl)lithium, (3-(1,3,3-trimethyl-6-azabicyclo [3.2.1]octanyl)propyl)lithium, (3-(1,2,3,6-tetrahydropyridinyl)propyl)lithium, (2-(hexamethyleneiminyl)ethyl)lithium, (4-(hexamethyleneiminyl)butyl)lithium, (5-(hexamethyleneiminyl)pentyl)lithium, (6-(hexamethyleneiminyl)hexyl) lithium, (10-(hexamethyleneiminyl)decyl)lithium, (4-(piperidinyl)-2-butenyl) lithium, (4-(hexamethyleneiminyl)-2-butenyl)lithium, (4-(heptamethyleneiminyl)-2-butenyl) lithium, (4-(octamethyleneiminyl)-2-butenyl)lithium, (4-(1, 3,3-trimethyl-6-azabicyclo[3.2.1]octanyl)-2-butenyl) lithium, (4-(1,2,3,6-tetrahydropyridinyl)-2-butenyl)lithium, (4-(hexamethyleneiminyl)-2-methyl-2-butenyl)lithium, and (4-(hexamethyleneiminyl)-3-methyl-2-butenyl)lithium. The organolithium compound is not limited to such compounds, and includes any analogous compound thereof satisfying the above conditions. Preferred are (3-(piperidinyl)propyl) lithium, (3-(hexamethyleneiminyl)propyl)lithium, (3-(1,2,3, 6-tetrahydropyridinyl)propyl)lithium, (4-(piperidinyl)-2-butenyl) lithium, and (4-(hexamethyleneiminyl)-2-butenyl) lithium, more preferred are (3-(hexamethyleneiminyl) propyl)lithium, (4-(piperidinyl)-2-butenyl) lithium, and (4-(hexamethyleneiminyl)-2-butenyl)lithium, and further preferred is (4-(piperidinyl)-2-butenyl)lithium, from the viewpoint of reactivity to and interaction with an inorganic filler such as carbon and silica and control of chain transfer reaction described later.

Examples of organolithium compounds represented by the formula (16) include, but not limited to, N,N-dimethyl-o-toluidinolithium, N,N-dimethyl-m-toluidinolithium, N,N-dimethyl-p-toluidinolithium, N,N-diethyl-o-toluidinolithium, N,N-diethyl-m-toluidinolithium, N,N-diethyl-p-toluidinolithium, N,N-dipropyl-o-toluidinolithium, N,N-dipropyl-m-toluidinolithium, N,N-dipropyl-p-toluidinolithium, N,N-dibutyl-o-toluidinolithium, N,N-dibutyl-m-toluidinolithium, N,N-dibutyl-p-toluidinolithium, o-piperidinotoluenolithium, p-piperidinotoluenolithium, o-pyrrolidinotoluenolithium, p-pyrrolidinotoluenolithium, N,N,N',N'-tetramethyltoluylenediaminolithium, N,N,N',N'-tetraethyltoluylenediaminolithium, N,N,N',N'-tetrapropyltoluylenediaminolithium, N,N-dimethylxylidinolithium, N,N- diethylxylidinolithium, N,N-dipropylxylidinolithium, N,N-dimethylmesidinolithium, N,N-diethylmesidinolithium, (N,N-dimethylamino)toluylphenylmethylaminolithium, 1-(N,N-dimethylamino)-2-methylnaphthalenolithium, and 1-(N,N-dimethylamino)-2-methylanthracenolithium. The organolithium compound is not limited to such compounds, and includes any analogous compound thereof satisfying the above conditions. More preferred is N,N-dimethyl-o-toluidinolithium from the viewpoint of polymerization activity.

Examples of organolithium compounds represented by the formula (17) include, but not limited to, 2-(2-methylpiperidinyl)-1-ethyllithium (e.g., "AI-250", as a trade name, manufactured by FMC Corporation). The organolithium compound is not limited to such compounds, and includes any analogous compound thereof satisfying the above conditions.

An organolithium compound having at least one nitrogen atom in the molecule may be prepared in advance before the polymerization step, by using any of known methods. The organolithium compound having at least one nitrogen atom in the molecule represented by the formula (14) can be obtained, for example, through reacting the compound represented by the formula (24) and an organolithium compound in a hydrocarbon solvent. For the hydrocarbon solvent, an appropriate solvent such as hexane, cyclohexane, and benzene is suitably selected. The reaction temperature is preferably 0° C. or more and 80° C. or less. From the viewpoint of productivity, the reaction temperature is preferably 5.0° C. or more and 70° C. or less, and more preferably 7.0° C. or more and 50° C. or less.

The organolithium compound having at least one nitrogen atom in the molecule represented by the formula (15) in the case that $R^{14}$ is an alkylene group having 1 to 20 carbon atoms can be obtained, for example, through reacting the compound represented by the formula (25) and an organolithium compound in a hydrocarbon solvent to prepare a lithium amide compound, reacting a dihalogenated alkyl represented by the following formula (C) therewith, and further reacting an organolithium compound therewith.

$$X^1\text{—}R^{3a}\text{—}X^2 \quad (C)$$

In the formula (C), $X^1$ and $X^2$ each independently denote an I atom, a Br atom, or a Cl atom; and $R^{3a}$ denotes an alkylene group having 1 to 20 carbon atoms, and is preferably an alkylene group having 2 to 16 carbons, and more preferably an alkylene group having 3 to 10 carbons.

Examples of compounds represented by the formula (C) include, but not limited to, 1-bromo-3-chloropropane, 1-bromo-4-chlorobutane, 1-bromo-5-chloropentane, 1-bromo-6-chlorohexane, 1-bromo-10-chlorodecane, 1-bromo-3-iodopropane, 1-bromo-4-iodobutane, 1-bromo-5-iodopentane, 1-bromo-6-iodohexane, 1-bromo-10-iododecane, 1-chloro-3-iodopropane, 1-chloro-4-iodobutane, 1-chloro-5-iodopentane, 1-chloro-6-iodohexane, and 1-chloro-10-iododecane. The compound represented by the formula (C) is preferably 1-bromo-3-chloropropane, 1-bromo-4-chlorobutane, 1-bromo-5-chloropentane, 1-bromo-6-chlorohexane, or 1-bromo-10-chlorodecane, and more preferably 1-bromo-3-chloropropane, 1-bromo-4-chlorobutane, or 1-bromo-6-chlorohexane, from the viewpoint of reactivity and safety.

The reaction temperature during preparing a lithium amide compound by using the compound represented by the formula (25), an organolithium compound, and a hydrocarbon solvent is as described above. The reaction temperature during reacting the compound represented by the formula (C) with a lithium amide compound is preferably −78° C. or more and 70° C. or less, and more preferably −50° C. or more and 50° C. or less. The reaction temperature thereafter during reacting the resulting compound with an organolithium compound is preferably −78° C. or more and 70° C. or less, and more preferably −50° C. or more and 50° C. or less.

The reaction temperature during preparing a lithium amide compound by using the compound represented by the formula (26), an organolithium compound, and a hydrocarbon solvent is as described above. The reaction temperature during reacting the compound represented by the formula (C) with a lithium amide compound is preferably −78° C. or more and 70° C. or less, and more preferably −50° C. or more and 50° C. or less. The reaction temperature thereafter during reacting the resulting compound with an organolithium compound is preferably −78° C. or more and 70° C. or less, and more preferably −50° C. or more and 50° C. or less.

The organolithium compound having at least one nitrogen atom in the molecule represented by the formula (15) in the case that $R^{14}$ is a conjugated diene-based polymer including repeating units each represented by any of the formula (18) to (20) is synthesized through the following steps (I) to (IV).
(I) Reacting the compound represented by the formula (25) and an organolithium compound in a hydrocarbon solvent to synthesize a lithium amide compound.
(II) Reacting the resulting lithium amide compound with butadiene or isoprene in a hydrocarbon solvent.
(III) Adding an alcohol to deactivate lithium followed by subjecting the resulting product to distillation under reduced pressure.
(IV) Reacting the product obtained through distillation and an organolithium compound in a hydrocarbon solvent.

The reaction temperature in the step (I) of reacting the compound represented by the formula (25) and an organolithium compound in a hydrocarbon solvent to prepare a lithium amide is as described above. A common alcohol can be used for the above alcohol. However, alcohols having low molecular weight are preferred, and for example, preferred are methanol, ethanol, and isopropanol, and more preferred is ethanol. The reaction temperature in the step (IV) is preferably 0° C. or more and 80° C. or less, and more preferably 10° C. or more and 70° C. or less.

<Polar Compound>

In preparing the above organolithium compound, a polar compound may be added into the system. This addition can allow promotion of the formation and solubilization in a hydrocarbon solvent. Examples of polar compounds include, but not limited to, tertiary monoamines, tertiary diamines, linear ethers, and cyclic ethers.

Examples of the tertiary monoamine include, but not limited to, trimethylamine, triethylamine, methyldiethylamine, 1,1-dimethoxytrimethylamine, 1,1-diethoxytrimethylamine, 1,1-diethoxytriethylamine, N,N-dimethylformamide diisopropyl acetal, and N,N-dimethylformamide dicyclohexyl acetal.

Examples of the tertiary diamine include, but not limited to, N,N,N',N'-tetramethyldiaminomethane, N,N,N',N'-tetramethylethylenediamine, N,N,N',N'-tetramethylpropanediamine, N,N,N',N'-tetramethyldiaminobutane, N,N,N',N'-tetramethyldiaminopentane, N,N,N',N'-tetramethylhexanediamine, dipiperidinopentane, and dipiperidinoethane.

Examples of the linear ether include, but not limited to, dimethyl ether, diethyl ether, ethylene glycol dimethyl ether, diethylene glycol dimethyl ether, triethylene glycol dimethyl ether, and tetraethylenedimethyl ether.

Examples of the cyclic ether include, but not limited to, tetrahydrofuran, bis(2-oxolanyl)ethane, 2,2-bis(2-oxolanyl)propane, 1,1-bis(2-oxolanyl)ethane, 2,2-bis(2-oxolanyl)butane, 2,2-bis(5-methyl-2-oxolanyl)propane, and 2,2-bis(3,4,5-trimethyl-2-oxolanyl) propane.

Among the polar compounds, preferred are trimethylamine and triethylamine each as a tertiary monoamine; N,N,N',N'-tetramethylethylenediamine as a tertiary diamine; and tetrahydrofuran and 2,2-bis(2-oxolanyl)propane each as a cyclic ether. Only one polar compound may be used singly, or two or more polar compounds may be used in combination.

In the case that a polar compound is added in preparing the organolithium compound in the present embodiments, it is preferred to add 30 ppm by mass or more and 50000 ppm by mass or less of a polar compound, and it is more preferred to add 200 ppm by mass or more and 20000 ppm by mass or less of a polar compound, based on the amount of a solvent to be used in preparation. To sufficiently achieve the effects of promotion of the reaction and solubilization in a solvent, addition of 30 ppm by mass or more is preferred. In view of ensuring the degree of freedom of microstructural adjustment during the subsequent polymerization step and separation from a polymerization solvent during a step of recovering and purifying a solvent after polymerization, addition of 50000 ppm by mass or less is preferred.

An unmodified conjugated diene-based polymer can be obtained through polymerization of a conjugated diene compound or copolymerization of a conjugated diene compound and an aromatic vinyl compound, by using the above-described polymerization initiator system including an organolithium compound having at least one nitrogen atom in the molecule or polymerization initiator system including a compound having at least one nitrogen atom and an organolithium compound.

In the polymerization step, an organolithium compound having at least one nitrogen atom in the molecule may be prepared in advance in a given reactor and fed for polymerization reaction into a reactor for polymerization of a conjugated diene compound or copolymerization of a conjugated diene compound and an aromatic vinyl compound, or the above-described compound having at least one nitrogen atom in the molecule and organolithium compound may be mixed for preparation in a static mixer or in-line mixer. In the case that the above-described organolithium compound having at least one nitrogen atom in the molecule is used for the polymerization initiator system, only one organolithium compound having at least one nitrogen atom in the molecule may be used, and in addition two or more organolithium compounds having at least one nitrogen atom in the molecule may be used in a mixture thereof.

An unmodified conjugated diene-based polymer can be obtained through the polymerization step in which polymerization of a conjugated diene compound or copolymerization of a conjugated diene compound and an aromatic vinyl compound is performed by using the above-described polymerization initiator system including a compound having at least one nitrogen atom in the molecule and an organolithium compound.

In the polymerization step in the present embodiments, polymerization may be performed in any of a batch type and a continuous type. However, polymerization is preferably performed in a continuous type, more preferably in a continuous type with one reactor or two or more reactors linked together, from the viewpoint of stable production of a conjugated diene-based polymer having a high modification percentage, high molecular weight, and high degree of branching. Then, to achieve a modification percentage of 75% by mass or more and an MSR of 0.45 or less, it is preferred to set the polymerization temperature to 45° C. or more and 80° C. or less and set the solid content to 16.0% by mass or less, and set the concentration of the organolithium compound having at least one nitrogen atom in the molecule to 0.010 mol/L or less based on the volume of a hydrocarbon solvent. To achieve a modification percentage of 78% by mass or more and an MSR of 0.45 or less, it is preferred to control the polymerization temperature in the range of 50° C. or more and 80° C. or less and set the solid content to 16.0% by mass or less, and set the concentration of the organolithium compound having at least one nitrogen atom in the molecule to 0.010 mol/L or less based on the volume of a hydrocarbon solvent. Further, to achieve a modification percentage of 80% by mass or more and an MSR of 0.44 or less, it is preferred to control the polymerization temperature in the range of 50° C. or more and 80° C. or less and set the solid content to 16.0% by mass or less. It is also preferred to set the concentration of the organolithium compound having at least one nitrogen atom in the molecule to 0.0010 mol/L or less based on the volume of a hydrocarbon solvent. Furthermore, to achieve a modification percentage of 85% by mass or more and an MSR of 0.43 or less, it is preferred to control the polymerization temperature in the range of 50° C. or more and 78° C. or less and set the solid content to 16.0% by mass or less, and set the concentration of the organolithium compound having at least one nitrogen atom in the molecule to 0.0010 mol/L or less based on the volume of a hydrocarbon solvent. Still furthermore, to achieve a modification percentage of 88% by mass or more and an MSR of 0.42 or less, it is preferred to set the polymerization temperature to 55° C. or more and 76° C. or less and set the solid content to 15.0% by mass or less, and set the concentration of the organolithium compound having at least one nitrogen atom in the molecule to 0.0008 mol/L or less based on the volume of a hydrocarbon solvent. From the viewpoint of appropriate control of chain transfer reaction described later to achieve a modification percentage of 90% by mass or more and an MSR of 0.40 or less, in other words, to achieve a high modification percentage, high molecular weight, and high degree of branching, it is more preferred that polymerization be performed in a continuous type, the polymerization temperature be 60° C. or more and 72° C. or less, the solid content be 14.0% by mass or less, the organolithium compound having at least one nitrogen atom in the molecule be continuously added, and the concentration of the organolithium compound be 0.00070 mol/L or less based on the volume of a hydrocarbon solvent.

The polymerization process for the organolithium compound having at least one nitrogen atom in the molecule may be in a continuous type or in a batch type. However, a continuous type is preferred in which a monomer containing a conjugated diene compound and an initiator are continuously fed into a polymerization chamber to continuously polymerize, from the viewpoint of production efficiency. In the case of a continuous type, a monomer, solvent, and initiator for polymerization may be separately fed into a polymerization chamber, or a method using a mixing chamber with a stirrer or a method of continuously mixing with a static mixer or line mixer in piping may be employed.

From the viewpoint of the stability of the organolithium compound, a monomer and initiator for polymerization are preferably diluted in advance with a hydrocarbon solvent. The monomer preferably has a solid content, which will be described later, of 16% by mass or less. In the case that the initiator is an organolithium compound having at least one nitrogen atom in the molecule, the concentration of the organolithium compound having at least one nitrogen atom in the molecule is preferably 0.010 mol/L or less, more preferably 0.0010 mol/L or less, and further preferably 0.0008 mol/L or less, based on the volume of a hydrocarbon solvent. The lower limit is not particularly limited. However, the concentration of the organolithium compound having at least one nitrogen atom in the molecule is preferably 0.000001 mol/L or more.

In the polymerization step, preferably, polymerization is performed in a continuous type and the concentration of the organolithium compound having at least one nitrogen atom in the molecule is 0.010 mol/L or less, more preferably 0.0010 mol/L or less, and further preferably 0.0008 mol/L or less, based on the volume of a hydrocarbon solvent, from the viewpoint of stable production of a high-molecular-weight polymer. The lower limit is not particularly limited. However, the concentration of the organolithium compound having at least one nitrogen atom in the molecule is preferably 0.000001 mol/L or more.

In the case that polymerization is performed to produce a conjugated diene-based polymer as a copolymer of a conjugated diene compound and an aromatic vinyl compound by using the polymerization initiator system comprising a compound having at least one nitrogen atom in the molecule and an organolithium compound in the present embodiments, the compound having at least one nitrogen atom in the molecule in the polymerization initiator system promotes chain transfer reaction, as described in Makromol. chem 186. 1335-1350 (1985), and thus the living, active terminal tends to be deactivated, and particular production conditions may be required to achieve a high modification percentage. For example, higher polymerization temperature leads to a higher chain transfer speed or chain transfer rate, as described above. Accordingly, the resulting polymer tends to have a lower number-average molecular weight, higher degree of branching, and broader molecular weight distribution, and the number of block portions in each of which 30 or more aromatic vinyl units are continuously linked is likely to be smaller or zero, and thus the MSR is likely to be lower. However, deactivation of the living, active terminal is expected to be promoted, and the modification percentage may be lowered if production conditions are not controlled. A polymerization method in a continuous type is more likely to progress chain transfer reaction than that in a batch type.

The polymerization temperature may be in any range which allows the progression of anionic polymerization with chain transfer reaction controlled and provides a few or no blocks in each of which 30 or more aromatic vinyl compound units are continuously linked. However, the polymerization temperature is preferably 45° C. or more from the viewpoint of productivity, more preferably 80° C. or less from the viewpoint of controlling chain transfer reaction and reacting a sufficient amount of a modifier with the active terminal after the completion of polymerization, and further preferably 50° C. or more and 78° C. or less and furthermore preferably 60° C. or more and 75° C. or less from the viewpoint that the number of blocks in each of which 30 or more aromatic vinyl units are continuously linked is small.

In the polymerization step, the solid content (also referred to as "monomer concentration"), which is the content of, for example, a conjugated diene compound and an aromatic vinyl compound, based on the total mass of a conjugated diene compound and an aromatic vinyl compound and a solvent is preferably 16% by mass or less, more preferably 15% by mass or less, and further preferably 14% by mass or less, from the viewpoint of control of the above-described chain transfer reaction. The lower limit of the solid content is not particularly limited. However, the solid content is preferably 5.0% by mass or more.

In the polymerization step, it is preferred that polymerization be performed in a continuous type, the polymerization temperature be 45° C. or more and 80° C. or less, and the solid content be 16% by mass or less, from the viewpoint of control of chain transfer reaction and suppression of deactivation of the active terminal.

<Conjugated Diene-Based Polymer>

The conjugated diene-based polymer according to the present embodiments can be obtained through polymerizing at least a conjugated diene compound in a hydrocarbon solvent, and may be obtained through copolymerizing a conjugated diene compound and an aromatic vinyl compound. The conjugated diene-based polymer is preferably obtained through growth in anionic polymerization reaction by using a continuous polymerization method with an organolithium compound having at least one nitrogen atom in the molecule as a polymerization initiator. In particular, the conjugated diene-based polymer is more preferably a polymer having an active terminal derived from growth reaction in living anionic polymerization. In this manner, a modified conjugated diene-based polymer having a high modification percentage can be obtained.

<Conjugated Diene Compound>

The conjugated diene compound may be any conjugated diene compound being a polymerizable monomer, and examples thereof include, but not limited to, 1,3-butadiene, isoprene, 2,3-dimethyl-1,3-butadiene, 1,3-pentadiene, 3-methyl-1,3-pentadiene, 1,3-heptadiene, and 1,3-hexadiene. Among them, 1,3-butadiene and isoprene are preferred from the viewpoint of industrial availability. One of them may be used, and in addition two or more thereof may be used in combination.

<Aromatic Vinyl Compound>

The aromatic vinyl compound may be any aromatic vinyl compound being a monomer copolymerizable with a conjugated diene compound, and examples thereof include, but not limited to, styrene, p-methylstyrene, α-methylstyrene, vinylethylbenzene, vinylxylene, vinylnaphthalene, and diphenylethylene. Among them, styrene is preferred from the viewpoint of industrial availability. One of them may be used, and in addition two or more thereof may be used in combination.

<Solvent>

In the polymerization step, polymerization is preferably performed in a solvent. Examples of solvents include hydrocarbon-based solvents such as saturated hydrocarbons and aromatic hydrocarbons. Specific examples of hydrocarbon solvents include, but not limited to, aliphatic hydrocarbons such as butane, pentane, hexane, and heptane; alicyclic hydrocarbons such as cyclopentane, cyclohexane, methylcyclopentane, and methylcyclohexane; aromatic hydrocarbons such as benzene, toluene, and xylene; and hydrocarbons consisting of a mixture thereof.

Before a conjugated diene compound, aromatic vinyl compound, and polymerization solvent each in a single substance, or a mixture thereof are/is subjected to polymerization reaction, allenes and acetylenes as impurities can be treated in advance through reaction with an organometal compound. This treatment is preferred because inhibition of polymerization by impurities can be prevented by the treatment, resulting in a higher active terminal concentration in the polymer and a sharper molecular weight distribution (Mw/Mn), and in addition a higher modification percentage can be achieved.

In polymerization reaction for the conjugated diene-based polymer, a polar compound may be added. A polar compound allows an aromatic vinyl compound to randomly copolymerize with a conjugated diene compound, and can serve as a vinylating agent to control the microstructure of the conjugated diene portion. In addition, a polar compound is effective for improvement of the polymerization rate or the like.

Examples of polar compounds include, but not limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, and 2,2-bis(2-oxolanyl)propane; tertiary amine compounds such as tetramethylethylenediamine, dipiperidinoethane, trimethylamine, triethylamine, pyridine, and quinuclidine; alkali metal alkoxide compounds such as potassium-t-amylate, potassium-t-butyrate, sodium-t-butyrate, and sodium amylate; and phosphine compounds such as triphenylphosphine. One of these polar compounds may be used singly, or two or more thereof may be used in combination.

The use amount of the polar compound is not particularly limited, and can be selected in accordance with the purpose or the like. However, the use amount of the polar compound is preferably 0.01 mol or more and 100 mol or less per mole of a polymerization initiator. Such a polar compound (vinylating agent) can be used in an appropriate amount as a regulator for the microstructure of the conjugated diene portion in the polymer in accordance with an intended vinyl bond content. Additionally, most polar compounds have an effective randomizing effect in copolymerization of a conjugated diene compound and an aromatic vinyl compound at the same time, and can be used as an adjustment for the distribution of an aromatic vinyl compound or an adjustor for styrene block content. To randomize a conjugated diene compound and an aromatic vinyl compound, a method described in Japanese Patent Laid-Open No. 59-140211 may be used in which a part of 1,3-butadiene is intermittently added in the course of copolymerization.

The bonded conjugated diene content in the conjugated diene-based polymer according to the present embodiments is not particularly limited. However, the bonded conjugated diene content in the conjugated diene-based polymer according to the present embodiments is preferably 50% by mass or more and 100% by mass or less, and more preferably 60% by mass or more and 80% by mass or less. The bonded aromatic vinyl content in the conjugated diene-based polymer according to the present embodiments is not particularly limited. However, the bonded aromatic vinyl content in the conjugated diene-based polymer according to the present embodiments is preferably 0% by mass or more and 50% by mass or less, and more preferably 20% by mass or more and 40% by mass or less. The bonded conjugated diene content and bonded aromatic vinyl content are within the above ranges tend to be able to provide a vulcanizate having better balance between low hysteresis loss and wet skid resistance and further having more satisfactory abrasion resistance and fracture strength. The bonded aromatic vinyl content can be measured on the basis of the ultraviolet absorption of the phenyl group, and from the result the bonded conjugated diene content can be also determined. Specifically, measurement is performed in accordance with a method described later in Examples.

The vinyl bond content in the conjugated diene bonding unit is not particularly limited. However, the vinyl bond content in the conjugated diene bonding unit is preferably 10 mol % or more and 75 mol % or less, and more preferably 25 mol % or more and 65 mol % or less. The vinyl bond content within the above range can provide a vulcanizate having better balance between low hysteresis loss and wet skid resistance and further having more satisfactory abrasion resistance and fracture strength. Here, in the case that the modified conjugated diene-based polymer is a copolymer of butadiene and styrene, the vinyl bond content (1,2-bond content) in the butadiene bonding unit can be determined by accordance with the Hampton's method (R. R. Hampton, Analytical Chemistry, 21, 923 (1949)). Specifically, measurement is performed in accordance with a method described later in Examples.

The conjugated diene-based polymer may be a random copolymer, or a block copolymer. Examples of the random copolymer include, but not limited to, butadiene-isoprene random copolymer, butadiene-styrene random copolymer, isoprene-styrene random copolymer, and butadiene-isoprene-styrene random copolymer. The composition distribution of the each monomers in the copolymer chain is not particularly limited, and examples thereof include completely random copolymer with a nearly statistically random composition distribution, and tapered (sloping) random copolymer with a taper-shaped composition distribution. The manner of bonding to the conjugated diene, i.e., composition of 1,4-bonding and 1,2-bonding, for example, may be homogeneous, or in a distribution.

Examples of the block copolymer include, but not limited to, two-block copolymer consisting of two blocks, three-block copolymer consisting of three blocks, and four-block copolymer consisting of four blocks. When a block consisting of an aromatic vinyl compound such as styrene is denoted as S, and a block consisting of a conjugated diene compound such as butadiene and isoprene and/or a block consisting of a copolymer of aromatic vinyl compound and a conjugated diene compound are/is denoted as B, for example, the block copolymer is expressed, for example, as S-B two-block copolymer, S-B-S three-block copolymer, or S-B-S-B four-block copolymer.

In the above formulas, the interblock boundaries are not necessarily clearly discriminated. In the case that a block B is a copolymer of an aromatic vinyl compound and a conjugated diene compound, for example, the aromatic vinyl compound in the block B may be homogeneously distributed, or may be distributed in a tapered manner. Alternatively, a plurality of portions in which the aromatic vinyl compound is homogeneously distributed and/or a plurality of portions in which the aromatic vinyl compound is distributed in a tapered manner may coexist in a block B. Further, a plurality of segments different in aromatic vinyl compound content may coexist in a block B. In the case that a plurality of blocks S and a plurality of blocks B coexist in the copolymer, the structures, having molecular weight and composition, may be identical to or different from each other.

In the present embodiments, the double bond of the conjugated diene-based polymer obtained in accordance with the above-described production method can be totally or partially converted into a saturated hydrocarbon through further hydrogenation in an inert solvent. This hydrogenation can improve the thermal resistance and weatherability, and prevent degradation of a product in processing at high temperature. Thus, better performance is exerted in various applications including automobile applications.

The ratio of hydrogenation of unsaturated double bonds on the basis of a conjugated diene compound (also referred to as "hydrogenation ratio", simply) is not particularly limited, and can be arbitrarily selected in accordance with the purpose. In the case of use for a vulcanized rubber, it is preferred that the double bonds in the conjugated diene portion be partially remained. From this viewpoint, the hydrogenation ratio of the conjugated diene portion in the polymer is preferably 3.0% or more and 70% or less, more preferably 5.0% or more and 65% or less, and further preferably 10% or more and 60% or less. The hydrogenation ratio of aromatic double bonds on the basis of an aromatic vinyl compound in the copolymer of a conjugated diene compound and an aromatic vinyl compound is not particularly limited. However, the hydrogenation ratio of aromatic double bonds on the basis of an aromatic vinyl compound in the copolymer of a conjugated diene compound and an aromatic vinyl compound is preferably 50% or less, more preferably 30% or less, and further preferably 20% or less. The hydrogenation ratio can be determined by using a nuclear magnetic resonance apparatus (NMR).

The method for hydrogenation is not particularly limited, and known methods can be used. Examples of suitable methods for hydrogenation include a method in which a polymer solution is bubbled with gaseous hydrogen to hydrogenate in the presence of a catalyst. Examples of the catalyst include heterogeneous catalysts such as catalysts including a noble metal supported on a porous inorganic material; and homogeneous catalysts such as catalysts derived by reaction of a solubilized salt of nickel, cobalt, or the like with an organoaluminum or the like, and catalysts with a metallocene such as titanocene. Among them, titanocene catalysts are preferred from the viewpoint that particularly mild hydrogenation conditions can be selected. Hydrogenation of aromatic groups can be performed by using a noble metal-supported catalyst.

Specific examples of hydrogenation catalysts include, but not limited to, (1) supporting-type heterogeneous hydrogenation catalysts with a metal such as Ni, Pt, Pd, and Ru supported on carbon, silica, alumina, diatomaceous earth, or the like; (2) what is called Ziegler hydrogenation catalysts with a transition metal salt such as an organic acid salt or acetylacetone salt of Ni, Co, Fe, Cr, or the like and a reductant such as an organoaluminum; and (3) what is called organometal complexes such as organometal compounds of Ti, Ru, Rh, Zr, or the like. Further examples of hydrogenation catalysts include hydrogenation catalysts described in Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, Japanese Patent Publication No. 2-9041, and Japanese Patent Laid-Open No. 8-109219. Preferred examples of hydrogenation catalysts include a reaction mixture of a titanocene compound and a reducing organometal compound.

If an allenes or acetylenes are contained as an impurity in a conjugated diene compound, modification reaction described later may be inhibited. Accordingly, the total concentration (by mass) of such contaminating impurities is preferably 200 ppm by mass or less, more preferably 100 ppm by mass or less, and further preferably 50 ppm by mass or less, based on the total amount of a conjugated diene compound. Examples of allenes include propadiene and 1,2-butadiene. Examples of acetylenes include ethylacetylene and vinylacetylene.

The configuration in which the microstructure (the contents of various bonds in the above modified conjugated diene copolymer) is within the above range and further the glass transition temperature of the copolymer is within the range of −45° C. or more and −15° C. or less provides a vulcanizate having better balance between low hysteresis loss and wet skid resistance.

The glass transition temperature is defined as a peak top (inflection point) of a DSC differential curve derived from a DSC curve recorded with temperature elevation in a predetermined temperature range in accordance with ISO 22768: 2006. Specifically, the glass transition temperature is measured in accordance with a method described later in Examples.

In the case that the conjugated diene-based polymer according to the present embodiments is a copolymer of a conjugated diene compound and an aromatic vinyl compound, the conjugated diene-based polymer is preferably a copolymer having a few or no blocks in each of which 30 or more aromatic vinyl units are continuously linked. Specifically, in the case that the copolymer is a butadiene-styrene copolymer, the content of blocks in each of which 30 or more aromatic vinyl units are continuously linked is preferably 5.0% by mass or less, and more preferably 3.0% by mass or less, based on the total amount of the polymer, in a known method in which a polymer is decomposed in accordance with the Kolthoff's method (method described in I. M. KOLTHOFF, et al., J. Polym. Sci. 1, 429 (1946)) and the content of polystyrene, which is insoluble in methanol, is analyzed.

[Modification Step]

The method for producing a modified conjugated diene-based polymer according to the present embodiments comprises a modification step of modifying the conjugated diene-based polymer with a modifier having four or more alkoxy groups bonding to a silyl group and a tertiary amino group in one molecule.

<Modifier>

To obtain a modified conjugated diene-based polymer having an MSR of 0.45 or less and a modification percentage of 75% by mass or more, the modifier in the present embodiments is preferably a modifier capable of introducing a multi-branched structure including three or more branches into the conjugated diene-based polymer through reaction with the active terminal of the conjugated diene-based polymer derived from a polymerization initiator, and capable of introducing at least one functional group selected from the group consisting of an alkoxy group bonding to a silicon atom, a halogen group, and an amino group into the conjugated diene-based polymer through the modification step. Examples of the functional group which is possessed by the above modifier and reacts with the active terminal of the conjugated diene-based polymer derived from a polymerization initiator include an alkoxysilyl group, a silazane group, and a halosilyl group. The number of branches in the above multi-branched structure can be adjusted via the number of the above functional groups possessed by the modifier and the ratio of the modifier to be added, and the number of branches is preferably three or more, and more preferably four or more. The functional group which can be introduced into the conjugated diene-based polymer through the modification step is more preferably an alkoxy group bonding to a silicon atom or an amino group.

Specific examples of the modifier include, but not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, tris(3-trimethoxysilylpropyl)amine, tris(3-methyldimethoxysilylpropyl)amine, tris(3- triethoxysilylpropyl)amine, and tris(3-methyldiethoxysilylpropyl)amine.

From the viewpoint of the fuel-saving performance, the modifier preferably contains a modifier represented by any of the following general formulas (1) to (3).

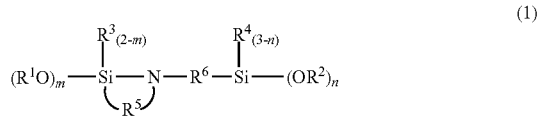
(1)

In the formula (1), $R^1$ to $R^4$ each independently denote an alkyl group having 1 to 20 carbon atoms or an aryl group having 6 to 20 carbon atoms; $R^5$ denotes an alkylene group having 1 to 10 carbon atoms; $R^6$ denotes an alkylene group having 1 to 20 carbon atoms; m denotes an integer of 1 or 2; n denotes an integer of 2 or 3; (m+n) denotes an integer of 4 or more; and in the case that a plurality of moieties is present as any of $R^1$ to $R^4$, they are independent of each other.

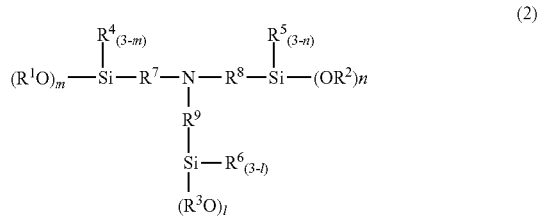
(2)

In the formula (2), $R^1$ to $R^6$ each independently denote an alkyl group having 1 to 20 carbon atoms or an aryl group having 6 to 20 carbon atoms; $R^7$ to $R^9$ each independently denote an alkylene group having 1 to 20 carbon atoms; m, n, and l each independently denote an integer of 1 to 3; (m+n+l) denotes an integer of 4 or more; and in the case that a plurality of moieties is present as any of $R^1$ to $R^6$, they are independent of each other.

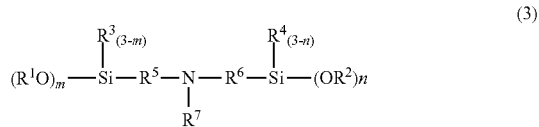
(3)

In the formula (3), $R^1$ to $R^4$ each independently denote an alkyl group having 1 to 20 carbon atoms or an aryl group having 6 to 20 carbon atoms; $R^5$ and $R^6$ each independently denote an alkylene group having 1 to 20 carbon atoms; m and n each independently denote an integer of 1 to 3; (m+n) denotes an integer of 4 or more; $R^7$ denotes an alkyl group having 1 to 20 carbon atoms, an aryl group having 6 to 20 carbon atoms, or a silyl group substituted with a hydrocarbon group; and in the case that a plurality of moieties is present as any of $R^1$ to $R^4$, they are independent of each other.

Examples of the modifier represented by the formula (1) include, but not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy-2-methyl-1-(3-trimethoxysilylpropyl)-1-aza-2-silacyclopentane, 2-ethoxy-2-ethyl-1-(3-triethoxysilylpropyl)-1-aza-2-silacyclopentane, 2-methoxy-2-methyl-1-(3-dimethoxymethylsilylpropyl)-1-aza-2-silacyclopentane, and 2-ethoxy-2-ethyl-1-(3-diethoxyethylsilylpropyl)-1-aza-2-silacyclopentane. Among them, modifiers in which m is 2 and n is 3 are preferred from the viewpoint of reactivity and interaction between the functional group of the modifier and an inorganic filler such as silica, and processability. Specifically, 2,2-dimethoxy-1-(3-trimethoxysilylpropyl)-1-aza-2-silacyclopentane and 2,2-diethoxy-1-(3-triethoxysilylpropyl)-1-aza-2-silacyclopentane are preferred.

The reaction temperature, reaction time, and so on in reacting the modifier represented by the formula (1) with an active polymer terminal are not particularly limited. However, reaction is preferably performed at 0° C. or more and 120° C. or less for 30 seconds or more. The ratio of the moles in total of alkoxy groups bonding to a silyl group in the compound of the modifier represented by the formula (1) to the moles of an alkali metal compound and/or alkali earth metal compound in a polymerization initiator added is preferably in the range of 0.6 or more and 3.0 or less, more preferably in the range of 0.8 or more and 2.5 or less, and further preferably 0.8 or more and 2.0 or less. The ratio is preferably 0.6 or more from the viewpoint of providing a resulting modified conjugated diene-based polymer with a sufficient modification percentage and molecular weight and a branched structure, and the ratio is preferably 3.0 or less from the viewpoint that it is preferred to couple the polymer terminals to obtain a branched polymer component for the purpose of improvement of the processability, and from the viewpoint of modifier cost.

Examples of the modifier represented by the formula (2) include, but not limited to, tris(3-trimethoxysilylpropyl)amine, tris(3-methyldimethoxysilylpropyl)amine, tris(3-triethoxysilylpropyl)amine, tris(3-methyldiethoxysilylpropyl)amine, tris(trimethoxysilylmethyl)amine, tris(2-trimethoxysilylethyl)amine, and tris(4-trimethoxysilylbutyl)amine. Among them, modifiers in which each of n, m, and l is 3 are preferred from the viewpoint of reactivity and interaction between the functional group of the modifier and an inorganic filler such as silica, and processability. Specific preferred examples include tris(3-trimethoxysilylpropyl)amine and tris(3-triethoxysilylpropyl)amine.

The reaction temperature, reaction time, and so on in reacting the modifier represented by the formula (2) with an active polymer terminal are not particularly limited. However, reaction is preferably performed at 0° C. or more and 120° C. or less for 30 seconds or more. The ratio of the moles in total of alkoxy groups bonding to a silyl group in the compound of the modifier represented by the formula (2) to the moles of lithium constituting the above-described polymerization initiator system is preferably in the range of 0.6 or more and 3.0 or less, more preferably in the range of 0.8 or more and 2.5 or less, and further preferably 0.8 or more and 2.0 or less. The ratio is preferably 0.6 or more from the viewpoint of providing a modified conjugated diene-based polymer with a sufficient modification percentage and molecular weight and a branched structure, and the ratio is preferably 3.0 or less from the viewpoint that it is preferred to couple the polymer terminals to obtain a branched polymer component for the purpose of improvement of the processability, and from the viewpoint of modifier cost.

Examples of the modifier represented by the formula (3) include, but not limited to, bis(3-(methylamino)propyl)trimethoxysilane, bis(3-(ethylamino)propyl)trimethoxysilane, bis(3-(propylamino)propyl)trimethoxysilane, and bis(3-(butylamino)propyl)trimethoxysilane. Among them, modifiers in which each of n, m, and l is 3 are preferred from the viewpoint of reactivity and interaction between the functional group of the modifier and an inorganic filler such as silica, and processability. Specific preferred examples include bis(3-(methylamino)propyl)trimethoxysilane and bis(3-(ethylamino)propyl)trimethoxysilane.

The reaction temperature, reaction time, and so on in reacting the modifier represented by the formula (3) with an active polymer terminal are not particularly limited. However, reaction is preferably performed at 0° C. or more and 120° C. or less for 30 seconds or longer.

From the viewpoint of obtaining a modified conjugated diene-based polymer having excellent balance between a high modification percentage, high molecular weight, and high degree of branching, and fuel-saving performance, processability, and abrasion resistance after conversion into a vulcanizate, it is preferred that the modifier comprise a modifier represented by the formula (1) in which m is 2 and n is 3; or the modifier comprise a modifier represented by the formula (2) in which each of m, n, and l is 3.

The ratio of the moles in total of alkoxy groups bonding to a silyl group in the compound of the modifier represented by the formula (3) to the moles of an alkali metal compound and/or alkali earth metal compound in a polymerization initiator added is preferably in the range of 0.6 or more and 3.0 or less, more preferably in the range of 0.8 or more and 2.5 or less, and further preferably 0.8 or more and 2.0 or less. The ratio is preferably 0.6 or more from the viewpoint of providing a resulting modified conjugated diene-based polymer with a sufficient modification percentage and molecular weight and a branched structure, and the ratio is preferably 3.0 or less from the viewpoint that it is preferred to couple the polymer terminals to obtain a branched polymer component for the purpose of improvement of the processability, and from the viewpoint of modifier cost.

In the modification process, the content of a conjugated diene compound is preferably 100 ppm by mass or more and 50000 ppm by mass or less, more preferably 200 ppm by mass or more and 10000 ppm by mass or less, and further preferably 300 ppm by mass or more and 5000 ppm by mass or less, based on the total amount of the monomers and the polymers, from the viewpoint of improvement of the modification percentage. The content of monomers containing a conjugated diene compound in a solution can be measured in accordance with a method described later in Examples.

In the method for producing a modified conjugated diene-based polymer according to the present embodiments, a deactivator, a neutralizer, or the like may be added to the copolymer solution after the modification reaction, as necessary. Examples of deactivators include, but not limited to, water; and alcohols such as methanol, ethanol, and isopropanol. Examples of neutralizers include, but not limited to, carboxylic acids such as stearic acid, oleic acid, and versatic acid; aqueous solutions of an inorganic acid; and carbon dioxide gas.

It is preferred to add a rubber stabilizer to the modified conjugated diene-based polymer according to the present embodiments from the viewpoint of prevention of gel generation after polymerization and improvement of the stability in processing. A known rubber stabilizer can be used, and preferred examples thereof include, but not limited to, antioxidizing agents such as 2,6-di-tert-butyl-4-hydroxytoluene (BHT), n-octadecyl-3-(4'-hydroxy-3',5'-di-tert-butylphenol)propionate, and 2-methyl-4,6-bis[(octylthio)methyl]phenol.

To further improve the processability of the modified conjugated diene-based polymer according to the present embodiments, an extender oil can be added to the modified conjugated diene copolymer, as necessary. Preferred examples of methods of adding an extender oil to the modified conjugated diene-based polymer include, but not limited to, a method in which an extender oil is added to the polymer solution, and the resultant is mixed to produce an oil-extended copolymer solution, and the oil-extended copolymer solution is subjected to desolventization. Examples of extender oils include aroma oil, naphthenic oil, and paraffin oil. Among them, aroma oil substitutes containing 3% by mass or less of a polycyclic aromatic (PCA) component on the basis of the IP346 method are preferred from the viewpoint of environmental safety, prevention of oil bleed, and wet grip properties. Examples of the aroma oil substitute include TDAE (Treated Distillate Aromatic Extracts) and MES (Mild Extraction Solvate) shown in Kautschuk Gummi Kunststoffe 52 (12) 799 (1999), and RAE (Residual Aromatic Extracts). The amount of the extender oil to be added is not particularly limited. However, the amount of the extender oil to be added is preferably 10 parts by mass or more and 60 parts by mass or less, and more preferably 15 parts by mass or more and 37.5 parts by mass or less, based on 100 parts by mass of the modified conjugated diene-based polymer.

[Desolventization Step]

The method for producing a modified conjugated diene-based polymer according to the present embodiments can further include a desolventization step. The desolventization step is a step of obtaining the modified conjugated diene-based polymer from the polymer solution, and a known method can be used therefor. Examples thereof include a method in which the solvent is separated through steam stripping or the like, and then the polymer is separated through filtration, and the residue is further dehydrated and dried to obtain the polymer, a method in which concentration is performed in a flushing tank, and devolatilization is further performed with a vent extruder or the like, and a method in which devolatilization is directly performed with a drum dryer or the like.

[Modified Conjugated Diene-Based Polymer Composition]

The modified conjugated diene-based polymer according to the present embodiments is suitably used as a vulcanizate. To obtain a vulcanizate, for example, the modified conjugated diene-based polymer according to the present embodiments is mixed, as necessary, with an inorganic filler such as a silica-based inorganic filler and carbon black, a rubbery polymer other than the modified conjugated diene-based polymer according to the present embodiments, a silane coupling agent, a rubber softener, a wax, a vulcanizing agent, a vulcanization accelerator, a vulcanization aid, and so on, to produce a modified conjugated diene-based polymer composition, and the modified conjugated diene-based polymer composition is then heated to vulcanize. Among such modified conjugated diene-based polymer compositions, preferred is a modified conjugated diene-based polymer composition comprising a rubber component and 0.5 part by mass or more and 300 parts by mass or less of a silica-based inorganic filler based on 100 parts by mass of the rubber component. More preferred is a modified conjugated diene-based polymer composition, the rubber component of which contains 20 parts by mass or more of the modified conjugated diene-based polymer according to the present embodiments based on 100 parts by mass of the rubber component.

<Rubber Component>

For the rubber component, which is comprised in the conjugated diene-based polymer composition, a rubbery polymer other than the modified conjugated diene-based polymer according to the present embodiments and the modified conjugated diene-based polymer according to the present embodiments can be used in combination. Examples of such rubbery polymers include, but not limited to, conjugated diene-based polymer or hydrogenated products thereof; random copolymers of a conjugated diene compound and vinyl aromatic compound or hydrogenated products thereof; block copolymers of a conjugated diene compound and vinyl aromatic compound or hydrogenated products thereof; non-diene-based polymers; and natural rubbers. More specific examples of rubbery polymers include butadiene rubbers or hydrogenated products thereof; isoprene rubbers or hydrogenated products thereof; styrenic-based elastomers such as styrene-butadiene rubbers or hydrogenated products thereof, styrene-butadiene block copolymers or hydrogenated products thereof, and styrene-isoprene block copolymers or hydrogenated products thereof; and acrylonitrile-butadiene rubbers or hydrogenated products thereof.

Examples of the rubbery polymer as a non-diene-based polymer include, but not limited to, olefinic elastomers such as ethylene-propylene rubbers, ethylene-propylene-diene rubbers, ethylene-butene-diene rubbers, ethylene-butene rubbers, ethylene-hexene rubbers, and ethylene-octene rubbers; butyl rubbers; brominated butyl rubbers; acrylic rubbers; fluororubbers; silicone rubbers; chlorinated polyethylene rubbers; epichlorohydrin rubbers; $\alpha,\beta$-unsaturated nitrile-acrylate-conjugated diene copolymer rubbers; urethane rubbers; and polyvulcanized rubbers.

The above-described each kind of the rubbery polymers may be a modified rubber with a polar functional group such as a hydroxy group and an amino group imparted thereto. The weight-average molecular weight is preferably 2000 or more and 2000000 or less, and more preferably 5000 or more and 1500000 or less, from the viewpoint of balance between performance and processing characteristics. The weight-average molecular weight can be measured in accordance with a measurement method for a modified conjugated diene-based polymer described in Examples. In addition, a low-molecular-weight rubber, what is called liquid rubber, can be used as the rubbery polymer. One of the rubbery polymers may be used singly, or two or more thereof may be used in combination.

When a modified conjugated diene-based polymer composition comprising the modified conjugated diene-based polymer according to the present embodiments and the above-described rubbery polymer is produced, the blend ratio (mass ratio) between them (modified conjugated diene-based polymer/rubbery polymer) is preferably 20/80 or more and 100/0 or less, more preferably 30/70 or more and 90/10 or less, and further preferably 50/50 or more and 80/20 or less. The configuration in which the blend ratio (modified conjugated diene-based polymer/rubbery polymer) is in the range can provide a vulcanizate having better balance between low hysteresis loss and wet skid resistance and further having more satisfactory abrasion resistance and fracture strength.

More preferred is a modified conjugated diene-based polymer composition containing 100 parts by mass of a rubber component containing 20 parts by mass or more of the above-described modified conjugated diene-based polymer and 0.5 part by mass or more and 300 parts by mass or less of a silica-based inorganic filler. The silica-based inorganic filler dispersed in the modified conjugated diene-based polymer according to the present embodiments provides excellent balance between low hysteresis loss and wet skid resistance, and abrasion resistance and fracture strength sufficient for practical use after conversion into a vulcanizate, and excellent processability during conversion into a vulcanizate is likely to be imparted. Also in the case that the modified conjugated diene-based polymer composition according to the present embodiments is used for vulcanized rubbers for automobile parts such as tires and anti-vibration rubbers, shoes, and so on, it is preferred for the modified conjugated diene-based polymer composition according to the present embodiments to comprise a silica-based inorganic filler.

Any known silica-based inorganic filler can be used without any limitation. However, the silica-based inorganic filler is preferably a solid particle containing $SiO_2$ or $Si_3Al$ as the structural unit, and more preferably a solid particle containing $SiO_2$ or $Si_3Al$ as the main component of the structural unit. The "main component" refers to a component contained at a content of 50% by mass or more, preferably at a content of 70% by mass or more, more preferably at a content of 80% by mass or more, in the silica-based inorganic filler.

Examples of the silica-based inorganic filler include, but not limited to, silica, clay, talc, mica, diatomaceous earth, wollastonite, montmorillonite, zeolite, and inorganic fibrous materials such as glass fibers. Examples of commercial products of silica include "Ultrasil 7000GR", as a trade name, manufactured by Evonik Degussa GmbH. Further examples of the silica-based inorganic filler include surface-hydrophobized silica-based inorganic fillers and mixtures of a silica-based inorganic filler and a non-silica-based inorganic filler. Among them, silica and glass fibers are preferred, and silica is more preferred, from the viewpoint of strength and abrasion resistance. Examples of silica include dry silica, wet silica, and synthesized silicate silica. Among them, wet silica is more preferred from the viewpoint of excellent balance between rapture characteristics-improving effect and wet skid resistance. In the modified conjugated diene-based polymer composition, the nitrogen adsorption specific surface area of the silica-based inorganic filler as determined by accordance with a BET adsorption method is preferably 100 $m^2/g$ or larger and 300 $m^2/g$ or smaller, and more preferably 170 $m^2/g$ or larger and 250 $m^2/g$ or smaller, from the viewpoint of obtaining abrasion resistance and rapture characteristics satisfactory in practical use. As necessary, a silica-based inorganic filler having relatively small specific surface area (e.g., 200 $m^2/g$ or smaller) and a silica-based inorganic filler having relatively large specific surface area (e.g., 200 $m^2/g$ or larger) can be used in combination. This combination can provide high degree of balance between satisfactory abrasion resistance and rapture characteristics and low hysteresis loss.

As described above, the blend ratio of the silica-based inorganic filler in the modified conjugated diene-based polymer composition is preferably 0.5 part by mass or more and 300 parts by mass or less, more preferably 5.0 parts by mass or more and 200 parts by mass or less, and further preferably 20 parts by mass or more and 100 parts by mass or less, based on 100 parts by mass of the rubber component containing the modified conjugated diene-based polymer according to the present embodiments. The blend ratio of the silica-based inorganic filler is preferably 0.5 part by mass or more from the viewpoint of allowing exertion of the effect of addition of the inorganic filler. From the viewpoint of sufficiently dispersing the inorganic filler to provide the composition with practically sufficient processability and mechanical strength, on the other hand, the blend ratio of the silica-based inorganic filler is preferably 300 parts by mass or less.

The modified conjugated diene-based polymer composition may further contain carbon black. Examples of carbon black include, but not limited to, carbon blacks of class SRF, FEF, HAF, ISAF, and SAF. Examples of commercial products of carbon black include "SEAST KH (N339)", as a trade name, manufactured by Tokai Carbon Co., Ltd. Among such carbon blacks, preferred is carbon black having a nitrogen adsorption specific surface area of 50 $m^2$/g or larger and an oil adsorption for dibutyl phthalate (DBP) of 80 mL/100 g or smaller.

The blend ratio of carbon black is preferably 0.5 part by mass or more and 100 parts by mass or less, more preferably 3.0 parts by mass or more and 100 parts by mass or less, and further preferably 5.0 parts by mass or more and 50 parts by mass or less, based on 100 part by mass of the rubber component containing the modified conjugated diene-based polymer according to the present embodiments. The blend ratio of carbon black is preferably 0.5 part by mass or more from the viewpoint of allowing exertion of performance required for tire application or the like such as dry grip performance and electroconductivity, and preferably 100 parts by mass or less from the viewpoint of dispersibility.

The modified conjugated diene-based polymer composition may further contain, except for the silica-based inorganic filler or carbon black, a metal oxide or metal hydroxide. The metal oxide refers to a solid particle having the Formula $M_xO_y$, where M denotes a metal atom; and x and y each independently denote an integer of 1 to 6, as a main component of its structural unit, and examples of applicable metal oxides include alumina, titanium oxide, magnesium oxide, and zinc oxide. In addition, a mixture of a metal oxide and an inorganic filler except metal oxides can be used. Examples of metal hydroxides include, but not limited to, aluminum hydroxide, magnesium hydroxide, and zirconium hydroxide.

The modified conjugated diene-based polymer composition may further contain a silane coupling agent. The silane coupling agent, which has a function to make the interaction between the rubber component and the silica-based inorganic filler closer, has a group with affinity or bondability to the rubber component and a group with affinity or bondability to the silica-based inorganic filler, and generally a compound having a sulfur-bonding portion, an alkoxysilyl group, and a silanol group portion in one molecule is used. Examples of such silane coupling agents include bis-[3-(triethoxysilyl)-propyl]-tetrasulfide, bis-[3-(triethoxysilyl)-propyl]-disulfide, and bis-[2-(triethoxysilyl)-ethyl]-tetrasulfide, and examples of commercial products thereof include "Si75", as a trade name, manufactured by Evonik Degussa GmbH.

The blend ratio of the silane coupling agent is preferably 0.1 part by mass or more and 30 parts by mass or less, more preferably 0.5 part by mass or more and 20 parts by mass or less, and further preferably 1.0 part by mass or more and 15 parts by mass or less, based on 100 parts by mass of the above-described silica-based inorganic filler. The blend ratio of the silane coupling agent in the range can make the effect of addition of the silane coupling agent more significant.

The modified conjugated diene-based polymer composition may further comprise a rubber softener for the purpose of improvement of processability. For the rubber softener, mineral oils or liquid or low-molecular-weight synthetic softeners are preferred. The mineral oil rubber softener, which is used for softening and bulking of a rubber or improvement of processability, and called process oil or extender oil, is a mixture of an aromatic ring, a naphthene ring, and a paraffin chain, and those in which the number of carbon atoms of the paraffin chain is 50% or more of the total number of carbon atoms are called paraffin rubber softeners, and those in which the number of carbon atoms of the naphthene ring is 30% or more and 45% or less of the total number of carbon atoms are called naphthene rubber softeners, and those in which the number of carbon atoms of the aromatic ring is more than 30% of the total number of carbon atoms are called aromatic rubber softeners. Examples of commercial products of a rubber softener include the S-RAE oil "JOMO Process NC140", as a trade name, manufactured by Japan Energy Corporation. For a rubber softener to be used together with the modified conjugated diene-aromatic vinyl copolymer according to the present embodiments, rubber softeners having a moderate aromatic content are preferred because of tendency to blend well with the copolymer.

The blend ratio of the rubber softener is preferably 0 part by mass or more and 100 parts by mass or less, more preferably 10 parts by mass or more and 90 parts by mass or less, and further preferably 30 parts by mass or more and 90 parts by mass or less, based on 100 parts by mass of the rubber component containing the modified conjugated diene-based polymer according to the present embodiments. The rubber softener in a blend ratio of 100 parts by mass or less based on 100 parts by mass of the rubber component tends to suppress bleed out and stickiness on the surface of the composition.

The method for mixing together the modified conjugated diene-based polymer according to the present embodiments and the rubbery polymer other than it, the silica-based inorganic filler, carbon black, and another filler, and an additive such as the silane coupling agent and the rubber softener is not particularly limited. Examples thereof include a melt-kneading method with a common mixing machine such as an open roll, a Banbury mixer, a kneader, a single-screw extruder, a twin-screw extruder, and a multi-screw extruder, and a method in which each of the components is melted and mixed together, and then the solvent is heated to remove. Among them, a melt-kneading method with a roll, a Banbury mixer, a kneader, or an extruder is preferred from the viewpoint of productivity and high ability to knead. Here, a method in which the modified conjugated diene-based polymer and each kind of the blending agents to be blended are kneaded at once and a method in which they are mixed in multiple mixing operations are both applicable.

The modified conjugated diene-based polymer composition may be vulcanized into a vulcanized composition by using a vulcanizing agent. Examples of the vulcanizing agent include, but not limited to, radical generators such as organic peroxides and azo compounds, oxime compounds, nitroso compounds, polyamine compounds, sulfur, and sulfur compounds. Examples of the sulfur compound include sulfur monochloride, sulfur dichloride, disulfide compounds, and polymeric polysulfide compounds. The use amount of the vulcanizing agent is preferably 0.01 part by mass or more and 20 parts by mass or less, and more preferably 0.1 part by mass or more and 15 parts by mass or less, based on 100 parts by mass of the rubber component containing the modified conjugated diene-based polymer according to the present embodiments. Conventionally known vulcanizing methods can be applied, and the vulcanization temperature is preferably 120° C. or more and 200° C. or less, and more preferably 140° C. or more and 180° C. or less.

In the vulcanization, a vulcanization accelerator or a vulcanization aid may be used, as necessary. Conventionally known vulcanization accelerators can be used, and examples thereof include sulfenamide, guanidine, thiuram, aldehydeamine, aldehyde-ammonia, thiazole, thiourea, and dithiocarbamate vulcanization accelerators. Specific examples of such compounds include N-cyclohexyl-2-benzothiazylsulfineamide and diphenylguanidine. Examples of the vulcanization aid include, but not limited to, zinc oxide and stearic acid. The use amount of the vulcanization accelerator is preferably 0.01 part by mass or more and 20 parts by mass or less, and more preferably 0.1 part by mass or more and 15 parts by mass or less, based on 100 parts by mass of the rubber component containing the modified conjugated diene-based polymer according to the present embodiments.

An additional softener and filler other than the above-described softeners and fillers, and various additives including a wax such as "Sunnoc N", as a trade name, manufactured by OUCHI SHINKO CHEMICAL INDUSTRIAL CO., LTD., a thermal stabilizer, an antistatic agent, a weathering stabilizer, an antioxidant such as N-isopropyl-N'-phenyl-p-phenylenediamine, a colorant, and lubricant may be used for the modified conjugated diene-based polymer composition without imparing the purpose of the present embodiments. Known softeners can be used for the additional softener. Examples of the additional filler include calcium carbonate, magnesium carbonate, aluminum sulfate, and barium sulfate. For the thermal stabilizer, antistatic agent, weathering stabilizer, antioxidant, colorant, and lubricant, known materials can be used.

EXAMPLES

Hereinafter, the present embodiments will be described in more detail with reference to specific Examples and Comparative Examples. However, the present embodiments are never limited by the following Examples and Comparative Examples and any modification within the gist is allowed. Physical properties in Examples and Comparative Examples described below were measured in accordance with the following methods.

(Physical Property 1) Bonding Styrene Content

A sample of a modified conjugated diene-based polymer in an amount of 100 mg was dissolved and diluted with chloroform in a measuring cylinder to 100 mL to prepare a measurement sample. The absorbance at an absorption wavelength for an ultraviolet ray (around 254 nm) derived from the phenyl group of styrene was measured to determine the bonding styrene content (% by mass) based on 100% by mass of the polymer sample ("UV-2450", as a trade name, manufactured by Shimadzu Corporation).

(Physical Property 2) Microstructure of Butadiene Portion (1,2-Vinyl Bond Content)

A sample of a modified conjugated diene-based polymer in an amount of 50 mg was dissolved in 10 mL of carbon disulfide to prepare a measurement sample. The infrared spectrum in the range of 600 to 1000 $cm^{-1}$ was measured by using a solution cell, and the microstructure of the butadiene portion, i.e., the 1,2-vinyl bond content (mol %) was determined from the absorbance at specific wavelengths by using a calculation formula in the Hampton's method ("FT-IR230", as a trade name, manufactured by JASCO Corporation).

(Physical Property 3) Mooney Viscosity and Mooney Stress-Relaxation Rate of Polymer The Mooney viscosity and Mooney stress-relaxation rate of a sample of a copolymer before addition of a modifier or a modified conjugated diene-based polymer were measured in accordance with JIS K6300 (ISO 289-1) and ISO 289-4 by using a Mooney viscometer ("VR1132", as a tradename, manufactured by Ueshima Seisakusho Co., Ltd.). The measurement temperature was set at 110° C. In the case of a sample extended with extender oil, measurement was performed at 100° C. First, a sample was pre-heated for 1 minute, and then the rotor was rotated at 2 rpm, and the torque after 4 minutes was measured, and the measured value was used as the Mooney viscosity (ML(1+4)). Thereafter, in the case of a sample of a modified conjugated diene-based polymer, the rotation of the rotor was immediately suspended, the torque in Mooney units was recorded every 0.1 seconds from 1.6 seconds to 5 seconds after the suspension to prepare a double logarithmical plot of torque versus time (sec), from which the slope of the line was calculated, and the absolute value of the slope was used as the Mooney stress-relaxation rate (MSR).

(Physical Property 4) Modification Percentage

Measurement was performed for a sample of a modified conjugated diene-based polymer by utilizing the feature of the modified component to be adsorbed in a GPC column including a packing material of silica gel. A chromatogram was acquired from a sample solution containing a sample and low-molecular-weight polystyrene as an internal standard by using a polystyrene gel column, and a chromatogram was acquired from the sample solution by using a silica column, and the amount of adsorption in the silica column was determined from the difference between these chromatograms to determine the modification percentage. Specific details are as follows.

Sample preparation: In 20 mL of tetrahydrofuran (THF), 10 mg of a sample and 5 mg of standard polystyrene were dissolved.

Measurement conditions for GPC with polystyrene column: THF was used as an eluent, and 200 µL of a sample was injected into the apparatus for measurement. A guard column ("TSKguardcolumn HHR-H", as a trade name, manufactured by Tosoh Corporation) and three columns ("TSKgel SuperMultipore HZ-H", as a trade name, manufactured by Tosoh Corporation) were connected together for use. A chromatogram was acquired by using an RI detector ("HLC8020", as a trade name, manufactured by Tosoh Corporation) with a solution of THF in TEA at a flow rate of 1.0 mL/min and a column oven temperature of 40° C.

Measurement conditions for GPC with silica column: THF was used as an eluent, and 200 µL of a sample was injected into the apparatus for measurement. The columns "Zorbax PSM-1000S", "PSM-300S", and "PSM-60S", each as a trade name, were connected together, to the preliminary stage of which a "DIOL 4.6×12.5 mm 5 micron", as a trade name, was connected as a guard column for use. A chromatogram was acquired by using an RI detector ("HLC8020", as a trade name, manufactured by Tosoh Corporation) with THF at a flow rate of 0.5 mL/min and a column oven temperature of 40° C.

Method for calculating modification percentage: By using the peak area for a sample, P1, and the peak area for standard polystyrene, P2, in a chromatogram obtained with the polystyrene column, where the total area of the peaks was 100, and the peak area for a sample, P3, and the peak area for standard polystyrene, P4, in a chromatogram obtained with the silica column, where the total area of the peaks was 100, the modification percentage (%) was determined from the following equation.

Modification percentage (%)=[1−(P2×P3)/(P1×P4)]×100

(where, P1+P2=P3+P4=100)

(Physical Property 5) Weight-Average Molecular Weight and Number-Average Molecular Weight A chromatogram was acquired from a sample of a modified conjugated diene-based polymer by using a GPC measurement apparatus equipped with three columns connected together each including a packing material of polystyrene gel, and the weight-average molecular weight (Mw) and number-average molecular weight (Mn) were determined on the basis of a calibration curve obtained by using standard polystyrene. Tetrahydrofuran (THF) was used as an eluent. A guard column ("TSKguardcolumn HHR-H", as a trade name, manufactured by Tosoh Corporation) and three columns ("TSKgel SuperMultipore HZ-H", as a trade name, manufactured by Tosoh Corporation) were connected together for use. An RI detector ("HLC8020", as a trade name, manufactured by Tosoh Corporation) was used with a solution of THF in TEA at a flow rate of 1.0 mL/min and a column oven temperature of 40° C. In 20 mL of THF, 10 mg of a sample for measurement was dissolved to prepare a measurement solution, and 200 μL of the measurement solution was injected into the GPC apparatus for measurement.

(Physical Property 6) Molecular Weight (Absolute Molecular Weight) in GPC-Light Scattering Measurement A chromatogram was acquired from a sample of a modified conjugated diene-based polymer by using a GPC-light scattering measurement apparatus equipped with three columns connected together each including a packing material of polystyrene gel, and the weight-average molecular weight (Mw-i) and number-average molecular weight (Mn-i) (also referred to as "absolute molecular weight") were determined by accordance with a solution viscosity method and light scattering method. A mixed solution of tetrahydrofuran and triethylamine (THF in TEA: prepared by mixing 5 mL of triethylamine in 1 L of tetrahydrofuran) was used as an eluent. A guard column ("TSKguardcolumn HHR-H", as a trade name, manufactured by Tosoh Corporation) and columns ("TSKgel G6000HHR", "TSKgel G5000HHR", "TSKgel G4000HHR", each as a trade name, manufactured by Tosoh Corporation) were connected together for use. A GPC-light scattering measurement apparatus ("Viscotek TDAmax", as a trade name, manufactured by Malvern Instruments Ltd.) was used with THF at a flow rate of 1.0 mL/min and an oven temperature of 40° C. In 20 mL of THF, 10 mg of a sample for measurement was dissolved to prepare a measurement solution, and 200 μL of the measurement solution was injected into the GPC measurement apparatus for measurement.

(Physical Property 7) Shrinkage Factor (g')

A chromatogram was acquired from a sample of a modified conjugated diene-based polymer by using a GPC-light scattering measurement apparatus with a viscosity detector, the apparatus being equipped with three columns connected together each including a packing material of polystyrene gel, and the molecular weight was determined by accordance with a solution viscosity method and light scattering method. A mixed solution of tetrahydrofuran and triethylamine (THF in TEA: prepared by mixing 5 mL of triethylamine in 1 L of tetrahydrofuran) was used as an eluent. A guard column ("TSKguardcolumn HHR-H", as a trade name, manufactured by Tosoh Corporation) and columns ("TSKgel G6000HHR", "TSKgel G5000HHR", "TSKgel G4000HHR", each as a trade name, manufactured by Tosoh Corporation) were connected together for use. A GPC-light scattering measurement apparatus with a viscosity detector ("Viscotek TDAmax", as a trade name, manufactured by Malvern Instruments Ltd.) was used with THF at a flow rate of 1.0 mL/min and an oven temperature of 40° C. In 20 mL of THF, 10 mg of a sample for measurement was dissolved to prepare a measurement solution, and 200 μL of the measurement solution was injected into the GPC measurement apparatus for measurement. For the obtained intrinsic viscosity and molecular weight of the sample, assuming that the constants (K, α) in the relation between intrinsic viscosity and molecular weight ([η]=KMα([η]: intrinsic viscosity, M: molecular weight)) satisfy log K=−3.883 and α=0.771, data were input in the range of molecular weight M of 1000 to 20000000 to prepare the relation between reference intrinsic viscosity $[\eta]_0$ and molecular weight M. The relation between the intrinsic viscosity [η], which was acquired at each molecular weight M, and the reference intrinsic viscosity $[\eta]_0$, $[\eta]/[\eta]_0$, was calculated at each molecular weight M, and the average value was used as the shrinkage factor (g').

(Physical Property 8) Nitrogen Content (Ppm by Mass)

In accordance with a chemiluminescence method in JIS-2609: "Crude petroleum and petroleum products—Determination of nitrogen content" by using a trace total nitrogen analyzer ("TN-2100H", manufactured by Mitsubishi Chemical Analytech Co., Ltd.), a sample of a modified conjugated diene-based polymer was wholly pyrolyzed under argon gas flow and then subjected to oxidative combustion with oxygen gas, and nitrogen monoxide generated was subjected to oxidation reaction with ozone gas under dehydration conditions, and the emission intensity detected in 590 to 2500 nm was measured, and the nitrogen content was determined from the area of the emission intensity.

(Physical Property 9) Glass Transition Temperature (Tg)

In accordance with ISO 22768: 2006 by using a differential scanning calorimeter ("DSC3200S", as a trade name, manufactured by MAC Science Co., Ltd.), a DSC curve for a sample of a modified conjugated diene-based polymer was recorded under helium flow at 50 mL/min while the temperature was elevated from −100° C. at 20° C./min, and the peak top (inflection point) in the DSC differential curve was used as the glass transition temperature.

(Example 1) Modified Conjugated Diene-Based Polymer (Sample A)

Two autoclaves each having an inner volume of 10 L and an inner height (L)-to-diameter (D) ratio, (L/D), of 4.0 and including an inlet at the bottom, an outlet at the top, a stirrer, and a jacket for temperature adjustment were connected together. Further, one static mixer was connected to the downstream of the outlet of the second reactor. Impurities such as moisture were removed in advance from 1,3-butadiene, and this 1,3-butadiene, styrene, and n-hexane were fed at 18.9 g/min, 10.6 g/min, and 180.2 g/min, respectively, to mix together. Immediately before this mixed solution entered the first reactor, n-butyllithium for deactivation treatment of impurities was fed at 0.087 mmol/min and mixed with the static mixer, and then the resultant was continuously fed to the bottom of the first reactor. Further, 2,2-bis(2-oxolanyl)propane as a polar substance and a mixed solution of piperidinolithium (also referred to as "1-lithiopiperidine", and abbreviated as "LA-1" in tables) prepared in advance as a lithium amide and n-butyllithium (mole ratio of piperidinolithium to n-butyllithium: 0.75:0.25) were fed to the bottom of the first reactor at feeding rates of 0.018 g/min and 0.180 mmol/min, respectively, and the inner temperature of the reactor was retained at 67° C. The polymer solution was continuously extracted from the top of the first reactor and continuously fed to the bottom of the second reactor to continue the reaction at 72° C., and further fed from the top of the second reactor to the static mixer. A small amount of the copolymer solution before addition of a modifier was extracted from the outlet of the second reactor, and an antioxidizing agent (BHT) was added thereto with the amount of addition controlled to 0.2 g per 100 g of the polymer, and then the solvent was removed. The Mooney viscosity of the resultant at 110° C. was measured to be 62. Subsequently, 2,2-dimethoxy-1-(3-trimethoxysilylpropyl)-1-aza-2-silacyclopentane (abbreviated as "AS-1" in tables) as a modifier, as shown in Table 1, was added to the copolymer solution continuously flowing into the static mixer at a feeding rate of 0.047 mmol/min to perform modification reaction. To the polymer solution flowing out of the static mixer, an antioxidizing agent (BHT) was added with the amount controlled to 0.2 g per 100 g of the polymer to terminate the modification reaction, and then the solvent was removed to afford a modified conjugated diene-based polymer (sample A).

The sample A was analyzed, and it was found that the Mooney viscosity at 110° C. was 128, the bonding styrene content was 35% by mass, the vinyl bond content (1,2-bond content) in the butadiene bonding unit was 40 mol %, and the modification percentage was 92.1%. Table 1 shows these results and the other physical properties of the sample A.

(Example 2) Modified Conjugated Diene-Based Polymer (Sample B)

A sample B was obtained in the same manner as in Example 1 except that 2,2-dimethoxy-1-(3-trimethoxysilylpropyl)-1-aza-2-silacyclopentane was replaced with tris(3-trimethoxysilylpropyl)amine (abbreviated as "AS-2" in tables) and the feeding rate was set at 0.032 mmol/min. The physical properties of the sample B are shown in Table 1.

(Example 3) Modified Conjugated Diene-Based Polymer (Sample C)

A sample C was obtained in the same manner as in Example 1 except that 2,2-dimethoxy-1-(3-trimethoxysilylpropyl)-1-aza-2-silacyclopentane was replaced with bis(3-(methylamino)propyl)trimethoxysilane (abbreviated as "AS-3" in tables) and the feeding rate was set at 0.048 mmol/min. The physical properties of the sample C are shown in Table 1.

(Example 4) Modified Conjugated Diene-Based Polymer (Sample D)

A sample D was obtained in the same manner as in Example 1 except that the feeding rates of 1,3-butadiene, styrene, and n-hexane in Example 1 were changed to 20.2 g/min, 11.3 g/min, and 177.4 g/min, respectively, and the inner temperature of the first reactor was retained at 70° C., and that the polymer solution was continuously extracted from the top of the first reactor and continuously fed to the bottom of the second reactor to continue the reaction at 76° C., and the feeding rates of n-butyllithium for deactivation treatment of impurities, the polar substance, the mixed solution of piperidinolithium and n-butyllithium, and 2,2-dimethoxy-1-(3-trimethoxysilylpropyl)-1-aza-2-silacyclopentane were changed to 0.093 mmol/min, 0.022 g/min, 0.192 mmol/min, and 0.050 mmol/min, respectively. The physical properties of the sample D are shown in Table 1.

(Example 5) Modified Conjugated Diene-Based Polymer (Sample E)

A sample E was obtained in the same manner as in Example 1 except that piperidinolithium was replaced with (4-(piperidinyl)-2-butenyl)lithium (abbreviated as "LA-2" in tables). The physical properties of the sample E are shown in Table 1.

(Example 6) Modified Conjugated Diene-Based Polymer (Sample F)

A sample F was obtained in the same manner as in Example 1 except that piperidinolithium was replaced with hexamethyleneiminolithium (abbreviated as "LA-3" in tables). The physical properties of the sample F are shown in Table 1.

(Example 7) Modified Conjugated Diene-Based Polymer (Sample G)

A sample G was obtained in the same manner as in Example 1 except that piperidinolithium was replaced with N,N-dimethyl-o-toluidinolithium (abbreviated as "LA-4" in tables). The physical properties of the sample G are shown in Table 1.

(Example 8) Modified Conjugated Diene-Based Polymer (Sample H)

A sample H was obtained in the same manner as in Example 1 except that piperidinolithium was replaced with 2-(2-methylpiperidinyl)-1-ethyllithium (abbreviated as "LA-5" in tables, "AI-250", as a trade name, manufactured by FMC Corporation). The physical properties of the sample H are shown in Table 1.

(Example 9) Modified Conjugated Diene-Based Polymer (Sample I)

A sample I was obtained in the same manner as in Example 1 except that the feeding rates of 1,3-butadiene, styrene, and n-hexane in Example 1 were changed to 21.7 g/min, 12.2 g/min, and 176.4 g/min, respectively, and the inner temperature of the first reactor was retained at 72° C., and that the polymer solution was continuously extracted from the top of the first reactor and continuously fed to the bottom of the second reactor to continue the reaction at 78° C., and the feeding rates of n-butyllithium for deactivation treatment of impurities, the polar substance, the mixed solution of piperidinolithium and n-butyllithium, and 2,2-dimethoxy-1-(3-trimethoxysilylpropyl)-1-aza-2-silacyclopentane were changed to 0.099 mmol/min, 0.026 g/min, 0.213 mmol/min, and 0.056 mmol/min, respectively. The physical properties of the sample I are shown in Table 1.

(Example 10) Modified Conjugated Diene-Based Polymer (Sample J)

A sample J was obtained in the same manner as in Example 9 except that the feeding rate of the polar substance 2,2-bis(2-oxolanyl)propane was changed to 0.028 g/min, the inner temperature of the first reactor was retained at 73° C., and the reaction was continued at an inner temperature of the second reactor of 80° C. The physical properties of the sample J are shown in Table 1.

(Comparative Example 1) Modified Conjugated Diene-Based Polymer (Sample K)

A sample K was obtained in the same manner as in Example 1 except that piperidinolithium was replaced with n-butyllithium. The physical properties of the sample K are shown in Table 2.

(Comparative Example 2) Modified Conjugated Diene-Based Polymer (Sample L)

A sample L was obtained in the same manner as in Example 1 except that the feeding rate of the polar substance 2,2-bis(2-oxolanyl)propane was changed to 0.027 g/min, the inner temperature of the first reactor was retained at 81° C., and the reaction was continued at an inner temperature of the second reactor of 86° C. The physical properties of the sample L are shown in Table 2.

(Comparative Example 3) Modified Conjugated Diene-Based Polymer (Sample M)

A sample M was obtained in the same manner as in Example 1 except that the feeding rates of 1,3-butadiene, styrene, and n-hexane in Example 1 were changed to 21.7 g/min, 12.2 g/min, and 176.4 g/min, respectively, and the feeding rates of n-butyllithium for deactivation treatment of impurities, the polar substance, and the mixed solution of piperidinolithium and n-butyllithium were changed to 0.079 mmol/min, 0.022 g/min, and 0.354 mmol/min, respectively, and the inner temperature of the first reactor was retained at 70° C., and that the polymer solution was continuously extracted from the top of the first reactor and continuously fed to the bottom of the second reactor to continue the reaction at 76° C., and the feeding rate of 2,2-dimethoxy-1-(3-trimethoxysilylpropyl)-1-aza-2-silacyclopentane was changed to 0.093 mmol/min. The physical properties of the sample M are shown in Table 2.

(Comparative Example 4) Modified Conjugated Diene-Based Polymer (Sample N)

A sample N was obtained in the same manner as in Example 1 except that the feeding rates of 1,3-butadiene, styrene, and n-hexane were changed to 22.9 g/min, 12.9 g/min, and 173.7 g/min, respectively, and the feeding rates of n-butyllithium for deactivation treatment of impurities, the polar substance 2,2-bis(2-oxolanyl)propane, and the mixed solution of piperidinolithium and n-butyllithium were changed to 0.095 mmol/min, 0.027 g/min, and 0.229 mmol/min, respectively, and the inner temperature of the first reactor was retained at 71° C., and that the polymer solution was continuously extracted from the top of the first reactor and continuously fed to the bottom of the second reactor to continue the reaction at 77° C., and the feeding rate of 2,2-dimethoxy-1-(3-trimethoxysilylpropyl)-1-aza-2-silacyclopentane was changed to 0.057 mmol/min. The physical properties of the sample N are shown in Table 2.

(Comparative Example 5) Modified Conjugated Diene-Based Polymer (Sample O)

A sample O was obtained in the same manner as in Example 1 except that the feeding rate of the polar substance 2,2-bis(2-oxolanyl)propane was changed to 0.016 g/min, piperidinolithium was replaced with n-butyllithium, and 2,2-dimethoxy-1-(3-trimethoxysilylpropyl)-1-aza-2-silacyclopentane was replaced with tris(3-trimethoxysilylpropyl)amine and the feeding rate was changed to 0.032 mmol/min. The physical properties of the sample O are shown in Table 2.

(Comparative Example 6) Modified Conjugated Diene-Based Polymer (Sample P)

A sample P was obtained in the same manner as in Example 1 except that the feeding rate of the polar substance 2,2-bis(2-oxolanyl)propane was changed to 0.032 g/min, and the inner temperature of the first reactor was retained at 76° C., and the reaction was continued at an inner temperature of the second reactor of 85° C., and 2,2-dimethoxy-1-(3-trimethoxysilylpropyl)-1-aza-2-silacyclopentane was replaced with tris(3-trimethoxysilylpropyl)amine and the feeding rate was changed to 0.048 mmol/min. The physical properties of the sample P are shown in Table 2.

(Comparative Example 7) Modified Conjugated Diene-Based Polymer (Sample Q)

A sample Q was obtained in the same manner as in Example 1 except that the feeding rate of the polar substance 2,2-bis(2-oxolanyl)propane was changed to 0.035 g/min, and the inner temperature of the first reactor was retained at 76° C., and the reaction was continued at an inner temperature of the second reactor of 88° C., and 2,2-dimethoxy-1-(3-trimethoxysilylpropyl)-1-aza-2-silacyclopentane was replaced with bis(3-(methylamino)propyl)trimethoxysilane and the feeding rate was changed to 0.072 mmol/min. The physical properties of the sample Q are shown in Table 2.

(Comparative Example 8) Modified Conjugated Diene-Based Polymer (Sample R)

A sample R was obtained in the same manner as in Example 1 except that the feeding rates of 1,3-butadiene, styrene, and n-hexane were changed to 22.9 g/min, 12.9 g/min, and 173.7 g/min, respectively, and the feeding rates of n-butyllithium for deactivation treatment of impurities, the polar substance 2,2-bis(2-oxolanyl)propane, and the mixed solution of piperidinolithium and n-butyllithium were changed to 0.096 mmol/min, 0.020 g/min, and 0.229 mmol/min, respectively, and polymerization was performed with tris(3-trimethoxysilylpropyl)amine in place of 2,2-dimethoxy-1-(3-trimethoxysilylpropyl)-1-aza-2-silacyclopentane at a feeding rate of 0.057 mmol/min. The physical properties of the sample R are shown in Table 2.

TABLE 1

|  |  |  | Example 1 | Example 2 | Example 3 | Example 4 | Example 5 |
|---|---|---|---|---|---|---|---|
|  | Modified conjugated diene-based polymer (sample No.) |  | A | B | C | D | E |
| Production conditions | Butadiene | (g/min) | 18.9 | 18.9 | 18.9 | 20.2 | 18.9 |
|  | Styrene | (g/min) | 10.6 | 10.6 | 10.6 | 11.3 | 10.6 |
|  | n-Hexane | (g/min) | 180.2 | 180.2 | 180.2 | 177.4 | 180.2 |
|  | Polymerization temperature | (° C.) | 72 | 72 | 72 | 76 | 72 |
|  | Solid content | (% by mass) | 14 | 14 | 14 | 15 | 14 |
|  | n-Butyllithium for treatment | (mmol/min) | 0.087 | 0.087 | 0.087 | 0.093 | 0.087 |
|  | Feeding rate of polar substance | (g/min) | 0.018 | 0.018 | 0.018 | 0.022 | 0.018 |
|  | Lithium amide/ n-butyllithium | Type | LA-1 | LA-1 | LA-1 | LA-1 | LA-2 |
|  |  | Feeding rate (mmol/min) | 0.180 | 0.180 | 0.180 | 0.192 | 0.180 |
|  |  | n-Butyllithium (mmol/min) | — | — | — | — | — |
|  | Concentration of lithium amide in solvent | (mol/L) | 0.00050 | 0.00050 | 0.00050 | 0.00054 | 0.00055 |
|  | Modifier | Type | AS-1 | AS-2 | AS-3 | AS-1 | AS-1 |
|  |  | Feeding rate (mmol/min) | 0.047 | 0.032 | 0.048 | 0.050 | 0.047 |
|  | Monomer concentration in modification reaction | (ppm by mass) | 1178 | 1174 | 1198 | 1279 | 1179 |
| Analytical values | (Physical property 1) Bonding styrene content | (% by mass) | 35 | 35 | 35 | 35 | 35 |
|  | (Physical property 2) 1,2-Vinyl bond content | (mol %) | 40 | 39 | 40 | 40 | 40 |
|  | (Physical property 3) Mooney viscosity | Before modification | 62 | 61 | 60 | 64 | 61 |
|  |  | After modification | 128 | 155 | 128 | 147 | 126 |
|  | (Physical property 3) Mooney stress-relaxation rate |  | 0.35 | 0.28 | 0.37 | 0.32 | 0.35 |
|  | (Physical property 4) Modification percentage | (% by mass) | 92.1 | 93.6 | 91.2 | 88.0 | 91.9 |
|  | (Physical property 5) Weight-average molecular weight (Mw) |  | 754000 | 883000 | 732000 | 801000 | 753000 |
|  | (Physical property 5) Number-average molecular weight (Mn) |  | 363000 | 442000 | 349000 | 359000 | 362000 |
|  | (Mw/Mn) |  | 2.08 | 2.00 | 2.10 | 2.26 | 2.08 |
|  | (Physical property 6) Weight-average molecular weight in GPC-light scattering measurement (Mw − i) |  | 808000 | 998000 | 784000 | 853000 | 807000 |
|  | (Physical property 6) Number-average molecular weight in GPC-light scattering measurement (Mn − i) |  | 510000 | 707000 | 485000 | 480000 | 509000 |
|  | (Mn − i/Mn) |  | 1.40 | 1.60 | 1.39 | 1.07 | 1.40 |
|  | (Mw − i/Mw) |  | 1.07 | 1.13 | 1.07 | 1.07 | 1.07 |
|  | (Physical property 7) Shrinkage factor (g') |  | 0.75 | 0.68 | 0.76 | 0.78 | 0.75 |
|  | (Physical property 8) Nitrogen atom content | (ppm by mass) | 82 | 76 | 82 | 82 | 82 |
|  | (Physical property 9) Glass transition temperature | (° C.) | −25 | −25 | −25 | −25 | −25 |

|  |  |  | Example 6 | Example 7 | Example 8 | Example 9 | Example 10 |
|---|---|---|---|---|---|---|---|
|  | Modified conjugated diene-based polymer (sample No.) |  | F | G | H | I | J |
| Production conditions | Butadiene | (g/min) | 18.9 | 18.9 | 18.9 | 21.7 | 21.7 |
|  | Styrene | (g/min) | 10.6 | 10.6 | 10.6 | 12.2 | 12.2 |
|  | n-Hexane | (g/min) | 180.2 | 180.2 | 180.2 | 176.4 | 176.4 |
|  | Polymerization temperature | (° C.) | 72 | 72 | 72 | 78 | 80 |
|  | Solid content | (% by mass) | 14 | 14 | 14 | 16 | 16 |
|  | n-Butyllithium for treatment | (mmol/min) | 0.087 | 0.087 | 0.087 | 0.099 | 0.099 |
|  | Feeding rate of polar substance | (g/min) | 0.018 | 0.018 | 0.018 | 0.026 | 0.028 |
|  | Lithium amide/ n-butyllithium | Type | LA-3 | LA-4 | LA-5 | LA-1 | LA-1 |
|  |  | Feeding rate (mmol/min) | 0.180 | 0.180 | 0.180 | 0.213 | 0.213 |
|  |  | n-Butyllithium (mmol/min) | — | — | — | — | — |
|  | Concentration of lithium amide in solvent | (mol/L) | 0.00055 | 0.00055 | 0.00055 | 0.00081 | 0.00081 |
|  | Modifier | Type | AS-1 | AS-1 | AS-1 | AS-1 | AS-1 |
|  |  | Feeding rate (mmol/min) | 0.047 | 0.047 | 0.047 | 0.056 | 0.056 |
|  | Monomer concentration in modification reaction | (ppm by mass) | 1177 | 1182 | 1190 | 1380 | 1292 |
| Analytical values | (Physical property 1) Bonding styrene content | (% by mass) | 35 | 35 | 35 | 35 | 35 |
|  | (Physical property 2) 1,2-Vinyl bond content | (mol %) | 39 | 40 | 40 | 40 | 40 |
|  | (Physical property 3) Mooney viscosity | Before modification | 61 | 60 | 59 | 55 | 57 |
|  |  | After modification | 127 | 124 | 128 | 118 | 111 |

TABLE 1-continued

|  |  |  |  |  |  |  |
|---|---|---|---|---|---|---|
| (Physical property 3) Mooney stress-relaxation rate |  | 0.37 | 0.39 | 0.37 | 0.42 | 0.44 |
| (Physical property 4) Modification percentage | (% by mass) | 90.2 | 91.1 | 90.2 | 86.2 | 84.8 |
| (Physical property 5) Weight-average molecular weight (Mw) |  | 762000 | 746000 | 752000 | 712000 | 703000 |
| (Physical property 5) Number-average molecular weight (Mn) |  | 342000 | 353000 | 367000 | 327000 | 319000 |
| (Mw/Mn) |  | 2.22 | 2.11 | 2.05 | 2.18 | 2.20 |
| (Physical property 6) Weight-average molecular weight in GPC-light scattering measurement (Mw – i) |  | 821000 | 791000 | 805000 | 726000 | 717000 |
| (Physical property 6) Number-average molecular weight in GPC-light scattering measurement (Mn – i) |  | 451000 | 473000 | 488000 | 405000 | 39900 |
| (Mn – i/Mn) |  | 1.32 | 1.34 | 1.33 | 1.25 | 1.24 |
| (Mw – i/Mw) |  | 1.08 | 1.06 | 1.07 | 1.02 | 1.02 |
| (Physical property 7) Shrinkage factor (g') |  | 0.75 | 0.75 | 0.75 | 0.79 | 0.81 |
| (Physical property 8) Nitrogen atom content | (ppm by mass) | 82 | 82 | 82 | 84 | 84 |
| (Physical property 9) Glass transition temperature | (° C.) | −25 | −25 | −25 | −25 | −25 |

TABLE 2

|  |  |  | Comparative Example 1 | Comparative Example 2 | Comparative Example 3 | Comparative Example 4 |
|---|---|---|---|---|---|---|
|  | Modified conjugated diene-based polymer (sample No.) |  | K | L | M | N |
| Production conditions | Butadiene | (g/min) | 18.9 | 18.9 | 21.7 | 22.9 |
|  | Styrene | (g/min) | 10.6 | 10.6 | 12.2 | 12.9 |
|  | n-Hexane (solvent) | (g/min) | 180.2 | 180.2 | 176.4 | 173.7 |
|  | Polymerization temperature | (° C.) | 72 | 86 | 76 | 77 |
|  | Solid content | (% by mass) | 14 | 14 | 16 | 17 |
|  | n-Butyllithium for treatment | (mmol/min) | 0.087 | 0.087 | 0.079 | 0.095 |
|  | Feeding rate of polar substance | (g/min) | 0.018 | 0.027 | 0.022 | 0.027 |
|  | Lithium amide/n-butyllithium Type |  | — | LA-1 | LA-1 | LA-1 |
|  | Feeding rate | (mmol/min) | — | 0.180 | 0.354 | 0.229 |
|  | n-Butyllithium | (mmol/min) | 0.180 | — | — | — |
|  | Concentration of lithium amide in solvent | (mol/L) | 0 | 0.00055 | 0.0102 | 0.00063 |
|  | Modifier Type |  | AS-1 | AS-1 | AS-1 | AS-1 |
|  | Feeding rate | (mmol/min) | 0.047 | 0.047 | 0.093 | 0.057 |
|  | Monomer concentration in modification reaction | (ppm by mass) | 2096 | 1771 | 980 | 1771 |
| Analytical values | (Physical property 1) Bonding styrene content | (% by mass) | 35 | 35 | 35 | 35 |
|  | (Physical property 2) 1,2-Vinyl bond content | (mol %) | 40 | 39 | 40 | 40 |
|  | (Physical property 3) Mooney viscosity Before modification |  | 58 | 64 | 34 | 55 |
|  | After modification |  | 128 | 100 | 74 | 104 |
|  | (Physical property 3) Mooney stress-relaxation rate |  | 0.36 | 0.49 | 0.58 | 0.48 |
|  | (Physical property 4) Modification percentage | (% by mass) | 72.0 | 85.6 | 83.2 | 84.6 |
|  | (Physical property 5) Weight-average molecular weight (Mw) |  | 709000 | 649000 | 414000 | 647000 |
|  | (Physical property 5) Number-average molecular weight (Mn) |  | 312000 | 269000 | 214000 | 266000 |
|  | (Mw/Mn) |  | 2.27 | 2.42 | 1.94 | 2.44 |
|  | (Physical property 6) Weight-average molecular weight in GPC-light scattering measurement (Mw – i) |  | 773000 | 590000 | 406000 | 596000 |
|  | (Physical property 6) Number-average molecular weight in GPC-light scattering measurement (Mn – i) |  | 440000 | 240000 | 212000 | 244000 |
|  | (Mn – i/Mn) |  | 1.41 | 0.89 | 0.98 | 0.92 |
|  | (Mw – i/Mw) |  | 1.09 | 0.91 | 0.99 | 0.92 |
|  | (Physical property 7) Shrinkage factor (g') |  | 0.78 | 0.85 | 0.86 | 0.87 |
|  | (Physical property 8) Nitrogen atom content | (ppm by mass) | 16 | 69 | 117 | 72 |
|  | (Physical property 9) Glass transition temperature | (° C.) | −25 | −25 | −25 | −25 |

|  |  |  | Comparative Example 5 | Comparative Example 6 | Comparative Example 7 | Comparative Example 8 |
|---|---|---|---|---|---|---|
|  | Modified conjugated diene-based polymer (sample No.) |  | O | P | Q | R |
| Production conditions | Butadiene | (g/min) | 18.9 | 18.9 | 18.9 | 22.9 |
|  | Styrene | (g/min) | 10.6 | 10.6 | 10.6 | 12.9 |
|  | n-Hexane (solvent) | (g/min) | 180.2 | 180.2 | 180.2 | 173.7 |
|  | Polymerization temperature | (° C.) | 72 | 85 | 88 | 72 |
|  | Solid content | (% by mass) | 14 | 14 | 14 | 17 |
|  | n-Butyllithium for treatment | (mmol/min) | 0.087 | 0.087 | 0.087 | 0.096 |
|  | Feeding rate of polar substance | (g/min) | 0.016 | 0.032 | 0.035 | 0.020 |

TABLE 2-continued

| | | | | | | | |
|---|---|---|---|---|---|---|---|
| | Lithium amide/n-butyllithium | Type | | — | LA-1 | LA-1 | LA-1 |
| | | Feeding rate | (mmol/min) | — | 0.180 | 0.180 | 0.229 |
| | | n-Butyllithium | (mmol/min) | 0.180 | — | — | — |
| | | Concentration of lithium amide in solvent | (mol/L) | 0 | 0.00055 | 0.00055 | 0.00061 |
| | Modifier | Type | | AS-2 | AS-2 | AS-3 | AS-2 |
| | | Feeding rate | (mmol/min) | 0.032 | 0.048 | 0.072 | 0.057 |
| | Monomer concentration in modification reaction | | (ppm by mass) | 1770 | 1771 | 1768 | 1771 |
| Analytical values | (Physical property 1) Bonding styrene content | | (% by mass) | 35 | 35 | 35 | 35 |
| | (Physical property 2) 1,2-Vinyl bond content | | (mol %) | 40 | 39 | 40 | 40 |
| | (Physical property 3) Mooney viscosity | Before modification | | 57 | 62 | 64 | 64 |
| | | After modification | | 112 | 108 | 100 | 109 |
| | (Physical property 3) Mooney stress-relaxation rate | | | 0.32 | 0.49 | 0.47 | 0.49 |
| | (Physical property 4) Modification percentage | | (% by mass) | 73.6 | 87.6 | 83.2 | 87.0 |
| | (Physical property 5) Weight-average molecular weight (Mw) | | | 711000 | 649000 | 645000 | 652000 |
| | (Physical property 5) Number-average molecular weight (Mn) | | | 323000 | 269000 | 264000 | 271000 |
| | (Mw/Mn) | | | 2.20 | 2.68 | 2.44 | 2.41 |
| | (Physical property 6) Weight-average molecular weight in GPC-light scattering measurement (Mw − i) | | | 753000 | 610000 | 595000 | 598000 |
| | (Physical property 6) Number-average molecular weight in GPC-light scattering measurement (Mn − i) | | | 440000 | 314000 | 243000 | 245000 |
| | (Mn − i/Mn) | | | 1.36 | 1.06 | 0.92 | 0.92 |
| | (Mw − i/Mw) | | | 1.06 | 1.17 | 0.92 | 0.91 |
| | (Physical property 7) Shrinkage factor (g') | | | 0.68 | 0.89 | 0.90 | 0.90 |
| | (Physical property 8) Nitrogen atom content | | (ppm by mass) | 11 | 71 | 74 | 74 |
| | (Physical property 9) Glass transition temperature | | (° C.) | −25 | −25 | −25 | −25 |

In Table 1 and Table 2, "Solid content" is a value determined by the amounts of butadiene and styrene, as monomers, and the solvent fed, and was determined as the fraction (% by mass) of the mass of all monomers to the total amount (100% by mass) of all monomers and the solvent. "Concentration of lithium amide in solvent" refers to the concentration of lithium amide used in each of Examples 1 to 10 and Comparative Examples 1 to 8, and was determined as the fraction (mol/L) of each kind of lithium amide to the solvent. "Monomer concentration in modification reaction" is the fraction (ppm by mass) of the mass of the conjugated diene compound to the total amount of monomers and polymers, and was determined through measurement of the amount of the conjugated diene compound (styrene and butadiene) remaining in a sample by using gas chromatography (GC).

(Examples 11 to 20, Comparative Examples 9 to 16) Rubber Compositions

Each of the samples shown in Table 1 and Table 2 (samples A to R) was used as a rubber starting material, and a rubber composition containing the rubber starting material was obtained in accordance with the following formulation.

Rubber starting material (modified conjugated diene-based polymer (samples A to R)): 100.0 parts by mass Filler 1 (silica (("Ultrasil 7000GR", as a trade name, manufactured by Evonik Degussa GmbH)): 75.0 parts by mass Filler 2 (carbon black ("SEAST KH (N339)", as a trade name, manufactured by Tokai Carbon Co., Ltd.)): 5.0 parts by mass Silane coupling agent ("Si75", as a trade name, manufactured by Evonik Degussa GmbH): 6.0 parts by mass Process oil (S-RAE oil ("JOMO Process NC140", as a trade name, manufactured by Japan Energy Corporation)): 30.0 parts by mass Wax ("Sunnoc N", as a trade name, manufactured by OUCHI SHINKO CHEMICAL INDUSTRIAL CO., LTD.): 1.5 parts by mass Zinc oxide: 2.5 parts by mass Stearic acid: 2.0 parts by mass Antioxidant (N-isopropyl-N'-phenyl-p-phenylenediamine): 2.0 parts by mass Sulfur: 1.8 parts by mass, Vulcanization accelerator 1 (N-cyclohexyl-2-benzothiazylsulfineamide): 1.7 parts by mass Vulcanization accelerator 2 (diphenylguanidine): 2.0 parts by mass Total: 229.5 parts by mass The above materials were kneaded in accordance with the following method to obtain each rubber composition. By using a closed kneading machine (inner volume: 0.3 L) provided with a temperature controller, each of the rubber starting materials (samples A to R), the fillers 1 and 2 (silica, carbon black), the silane coupling agent, the process oil, the wax, zinc oxide, and stearic acid were kneaded together under the condition of a filling rate of 65% and rotor rotation frequency of 50/57 rpm, as a first stage of kneading. Then, the temperature of the closed kneading machine was controlled, and each rubber composition was obtained at a discharge temperature (blend) of 155 to 160° C.

Subsequently, as a second stage of kneading, the blend thus obtained was cooled to room temperature, and the antioxidant was then added thereto, and the resultant was kneaded again to improve the dispersion of the silica. Also in this case, the discharge temperature (blend) was adjusted to 155 to 160° C. through temperature control by the kneading machine. After cooling, the resultant was kneaded with sulfur and the vulcanization accelerators 1 and 2 by using an open roll set at 70° C., as a third stage of kneading. Thereafter, the resultant was molded, and vulcanized through vulcanization press at 160° C. for 20 minutes. The rubber compositions before vulcanization and the rubber compositions after vulcanization were evaluated. Specifically, evaluation was performed in accordance with the following methods. The results are shown in Table 3 and Table 4.

(Evaluation 1) Mooney Viscosity of Blend

The blend obtained between the completion of the second stage of kneading and the initiation of the third kneading was used as a sample. In accordance with JIS K6300-1 by using a Mooney viscometer, the sample was pre-heated at 130° C. for 1 minute, and then rotated on the rotor at 2 rpm for 4 minutes, and thereafter the viscosity was measured. The viscosity was converted to an index with respect to the result for Comparative Example 9 as 100. The smaller the value is, the better the processability is.

(Evaluation 2) Viscoelasticity Parameter

The viscoelasticity parameter was measured with a viscoelasticity tester (ARES-G2) manufactured by TA Instruments Japan Inc. in a twisting mode. Each of the measurements was converted into an index with respect to the result for Comparative Example 9 as 100. The tan δ measured at 0° C. with a frequency of 10 Hz and 1% strain was used as an indicator of wet grip performance. The higher the value is, the better the wet grip performance is. The tan δ measured at 50° C. with a frequency of 10 Hz and 3% strain was used as an indicator of fuel-saving characteristics. The smaller the value is, the better the fuel-saving performance is.

(Evaluation 3) Breaking Strength and Tensile Elongation

The breaking strength and tensile elongation were measured in accordance with tensile testing described in JIS K6251 by using the full-automatic tensile tester Strograph AE manufactured by Toyo Seiki Seisaku-sho, Ltd. Each of them was converted into an index with respect to the result for Comparative Example 9 as 100. The higher the value is, the better the fracture resistance is.

(Evaluation 4) Abrasion Resistance

The amount of abrasion after 1000 rotations at a load of 44.1 N was measured in accordance with JIS K6264-2 by using an Akron abrasion tester (manufactured by YASUDA SEIKI SEISAKUSHO, LTD.), and converted into an index with respect to the result for Comparative Example 9 as 100. The higher the index is, the better the abrasion resistance is.

TABLE 3

| | | | | Example 11 | Example 12 | Example 13 | Example 14 | Example 15 |
|---|---|---|---|---|---|---|---|---|
| | Modified conjugated diene-based polymer (sample No.) | | | A | B | C | D | E |
| | (Evaluation 1) Mooney viscosity of blend (130° C.) | | Index | 96 | 93 | 99 | 100 | 97 |
| Vulcanizate | (Evaluation 2) | tan δ at 50° C. (3% strain) | Index | 79 | 75 | 90 | 85 | 87 |
| | Viscoelasticity parameter | tan δ at 0° C. (1% strain) | Index | 115 | 114 | 109 | 107 | 115 |
| | (Evaluation 3) Breaking | Breaking strength | Index | 118 | 121 | 106 | 111 | 116 |
| | strength, tensile elongation | Tensile elongation | Index | 102 | 105 | 103 | 105 | 106 |
| | (Evaluation 4) Abrasion resistance | | Index | 125 | 130 | 108 | 109 | 123 |
| | | | | Example 16 | Example 17 | Example 18 | Example 19 | Example 20 |
| | Modified conjugated diene-based polymer (sample No.) | | | F | G | H | I | J |
| | (Evaluation 1) Mooney viscosity of blend (130° C.) | | Index | 95 | 99 | 100 | 100 | 100 |
| Vulcanizate | (Evaluation 2) | tan δ at 50° C. (3% strain) | Index | 88 | 90 | 82 | 86 | 88 |
| | Viscoelasticity parameter | tan δ at 0° C. (1% strain) | Index | 112 | 109 | 109 | 105 | 104 |
| | (Evaluation 3) Breaking | Breaking strength | Index | 117 | 116 | 128 | 105 | 105 |
| | strength, tensile elongation | Tensile elongation | Index | 103 | 105 | 116 | 102 | 102 |
| | (Evaluation 4) Abrasion resistance | | Index | 122 | 118 | 126 | 108 | 105 |

TABLE 4

| | | | | Comparative Example 9 | Comparative Example 10 | Comparative Example 11 | Comparative Example 12 |
|---|---|---|---|---|---|---|---|
| | Modified conjugated diene-based polymer (sample No.) | | | K | L | M | N |
| | (Evaluation 1) Mooney viscosity of blend (130° C.) | | Index | 100 | 112 | 115 | 98 |
| Vulcanizate | (Evaluation 2) | tan δ at 50° C. (3% strain) | Index | 100 | 112 | 93 | 95 |
| | Viscoelasticity parameter | tan δ at 0° C. (1% strain) | Index | 100 | 98 | 108 | 106 |
| | (Evaluation 3) Breaking | Breaking strength | Index | 100 | 125 | 75 | 93 |
| | strength, tensile elongation | Tensile elongation | Index | 100 | 80 | 60 | 95 |
| | (Evaluation 4) Abrasion resistance | | Index | 100 | 110 | 75 | 95 |
| | | | | Comparative Example 13 | Comparative Example 14 | Comparative Example 15 | Comparative Example 16 |
| | Modified conjugated diene-based polymer (sample No.) | | | O | P | Q | R |
| | (Evaluation 1) Mooney viscosity of blend (130° C.) | | Index | 95 | 111 | 102 | 101 |
| Vulcanizate | (Evaluation 2) | tan δ at 50° C. (3% strain) | Index | 97 | 118 | 113 | 95 |
| | Viscoelasticity parameter | tan δ at 0° C. (1% strain) | Index | 101 | 95 | 98 | 100 |
| | (Evaluation 3) Breaking | Breaking strength | Index | 106 | 95 | 92 | 96 |
| | strength, tensile elongation | Tensile elongation | Index | 90 | 96 | 94 | 95 |
| | (Evaluation 4) Abrasion resistance | | Index | 108 | 98 | 92 | 99 |

As shown in Table 3 and Table 4, it was at least found that the modified conjugated diene-based polymer compositions in Examples 11 to 20 each had lower tan δ at 50° C. and lower hysteresis loss, an indication of achievement of low rolling resistance for tires, and higher tan δ at 0° C., an indication of excellent wet skid resistance, than the compositions in Comparative Examples 9 to 16. Further, it was at least found that the modified conjugated diene-based polymer compositions in Examples 11 to 20 each had processability (Mooney viscosity of blend), abrasion resistance, and tensile characteristics sufficient for practical use. In particular, the modified conjugated diene-based polymer compositions in Example 11, in which a polymer with combination of piperidinolithium and 2,2-dimethoxy-1-(3-trimethoxysilylpropyl)-1-aza-2-silacyclopentane was used, and Example 12, in which a polymer with combination of piperidinolithium and tris(3-trimethoxysilylpropyl)amine was used, were particularly satisfactory in fuel-saving performance.

The present application is based on a Japanese patent application filed with the Japan Patent Office on Feb. 19, 2015 (Japanese Patent Application No. 2015-031082), and the content is incorporated herein by reference.

INDUSTRIAL APPLICABILITY

The modified conjugated diene-based polymer according to the present invention has industrial applicability in the fields of tire tread, interior/exterior trims for automobiles, anti-vibration rubbers, belts, shoes, foams, use for various industrial products, and so on.

The invention claimed is:

1. A modified conjugated diene-based polymer comprising a nitrogen atom,
   wherein a content of the nitrogen atom is 40 ppm by mass or more based on a total amount of the modified conjugated diene-based polymer,
   a Mooney stress-relaxation rate measured at 110° C. is 0.45 or less,
   a modification percentage is 84.8% by mass or more, and
   a ratio of a first weight-average molecular weight to a first number-average molecular weight is 1.50 or more and 3.50 or less.

2. The modified conjugated diene-based polymer according to claim 1, comprising a nitrogen atom at one or more terminal, and a star-shaped polymer structure having a nitrogen atom-containing alkoxysilane substituent positioned at a center thereof.

3. The modified conjugated diene-based polymer according to claim 1, wherein a shrinkage factor (g') determined by gel permeation chromatography (GPC)-light scattering measurement with a viscosity detector is 0.86 or less.

4. The modified conjugated diene-based polymer according to claim 1, wherein a ratio of a second number-average molecular weight determined by GPC-light scattering measurement to the first number-average molecular weight determined by measurement with GPC is 1.00 or more.

5. The modified conjugated diene-based polymer according to claim 1, wherein a ratio of a second weight-average molecular weight determined by GPC-light scattering measurement to the first weight-average molecular weight determined by measurement with GPC is 1.00 or more.

6. The modified conjugated diene-based polymer according to claim 1, wherein the first number-average molecular weight is 200000 or more and 2000000 or less.

7. The modified conjugated diene-based polymer according to claim 1, represented by following general formula (A) or (B):

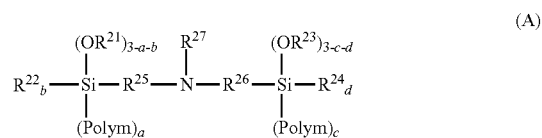

(A)

wherein $R^{21}$ to $R^{24}$ each independently denote an alkyl group having 1 to 20 carbon atoms or an aryl group having 6 to 20 carbon atoms;

$R^{25}$ and $R^{26}$ each independently denote an alkylene group having 1 to 20 carbon atoms;

$R^{27}$ denotes a hydrogen atom, a silyl group substituted with a hydrocarbon, an alkyl group having 1 to 20 carbon atoms, or an aryl group having 6 to 20 carbon atoms;

a and c each independently denote an integer of 1 or 2;

b and d each independently denote an integer of 0 or 1;

(a+b) and (c+d) each independently denote an integer of 2 or less;

(Polym) denotes a conjugated diene-based polymer derived by polymerization of a conjugated diene compound or copolymerization of a conjugated diene compound and an aromatic vinyl compound, wherein at least one terminal thereof is a functional group represented by any of general formulas (4) to (7) below; in a case that a plurality of moieties is present as $R^{21}$, $R^{23}$, or (Polym) they are independent of each other;

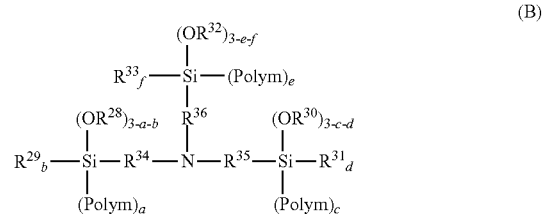

(B)

wherein $R^{28}$ to $R^{33}$ each independently denote an alkyl group having 1 to 20 carbon atoms or an aryl group having 6 to 20 carbon atoms;

$R^{34}$ to $R^{36}$ each independently denote an alkylene group having 1 to 20 carbon atoms;

a, c, and e each independently denote an integer of 1 or 2;

b, d, and f each independently denote an integer of 0 or 1;

(a+b), (c+d), and (e+f) each independently denote an integer of 2 or less;

(Polym) denotes a conjugated diene-based polymer derived by polymerization of a conjugated diene compound or copolymerization of a conjugated diene compound and an aromatic vinyl compound, wherein at least one terminal thereof is a functional group represented by any of following general formulas (4) to (7); in a case that a plurality of moieties is present as $R^{28}$, $R^{30}$, $R^{32}$, or (Polym) they are independent of each other;

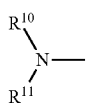

(4)

wherein $R^{10}$ and $R^{11}$ are each independently selected from the group consisting of an alkyl group having 1 to 12 carbon atoms, a cycloalkyl group having 3 to 14 carbon atoms, and an aralkyl group having 6 to 20 carbon atoms;

$R^{10}$ and $R^{11}$ may be attached together to form a cyclic structure together with an adjacent nitrogen atom, and in this case, $R^{10}$ and $R^{11}$ denote an alkylene group having 5 to 12 carbon atoms, and may have an unsaturated bond or a branched structure in a part thereof;

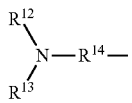

(5)

wherein $R^{15}$ and $R^{16}$ are each independently selected from the group consisting of an alkyl group having 1 to 12 carbon atoms, a cycloalkyl group having 3 to 14 carbon atoms, and an aralkyl group having 6 to 20 carbon;

$R^{15}$ and $R^{16}$ may be attached together to form a cyclic structure together with an adjacent nitrogen atom, and in this case, RB and RB denote an alkylene group having 5 to 12 carbon atoms, and may have an unsaturated bond or a branched structure in a part thereof;

$R^{14}$ denotes an alkylene group having 1 to 20 carbon atoms or a conjugated diene-based polymer having 1 to 20 carbon atoms;

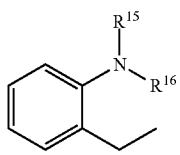

(6)

wherein $R^{15}$ and $R^{16}$ are each independently selected from the group consisting of an alkyl group having 1 to 12 carbon atoms, a cycloalkyl group having 3 to 14 carbon atoms, and an aryl group having 6 to 20 carbon atoms; and $R^{15}$ and $R^{16}$ may be attached together to form a cyclic structure together with an adjacent nitrogen atom, and in this case, $R^{15}$ and $R^{16}$ denote an alkylene group having 5 to 12 carbon atoms, and may have a branched structure in a part thereof;

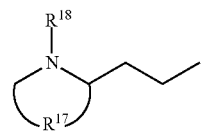

(7)

wherein $R^{17}$ denotes a hydrocarbon group having 2 to 10 carbon atoms, and may have an unsaturated bond or a branched structure in a part thereof; and $R^{18}$ denotes an alkyl group having 1 to 12 carbon atoms, and may have a branched structure in a part thereof.

8. A method for producing the modified conjugated diene-based polymer according to claim 1, comprising steps of:

polymerizing at least a conjugated diene compound in a presence of an organolithium compound having at least one nitrogen atom in a molecule to obtain a conjugated diene-based polymer; and modifying the conjugated diene-based polymer with a modifier having four or more alkoxy groups bonding to a silyl group and a tertiary amino group in one molecule.

9. The method for producing the modified conjugated diene-based polymer according to claim 8, wherein the modifier comprises a modifier represented by any of following general formulas (1) to (3):

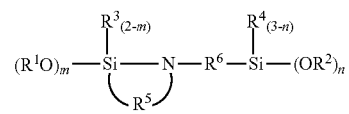

(1)

wherein $R^1$ to $R^4$ each independently denote an alkyl group having 1 to 20 carbon atoms or an aryl group having 6 to 20 carbon atoms; $R^5$ denotes an alkylene group having 1 to 10 carbon atoms; $R^6$ denotes an alkylene group having 1 to 20 carbon atoms; m denotes an integer of 1 or 2; n denotes an integer of 2 or 3; (m+n) denotes an integer of 4 or more; and in a case that a plurality of moieties is present as any of $R^1$ to $R^4$, they are independent of each other;

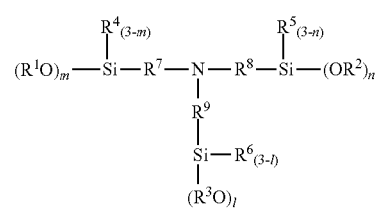

(2)

wherein $R^1$ to $R^6$ each independently denote an alkyl group having 1 to 20 carbon atoms or an aryl group having 6 to 20 carbon atoms; $R^7$ to $R^9$ each independently denote an alkylene group having 1 to 20 carbon atoms; m, n, and l each independently denote an integer of 1 to 3; (m+n+l) denotes an integer of 4 or more; and in a case that a plurality of moieties is present as any of $R^1$ to $R^6$, they are independent of each other;

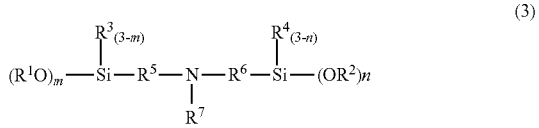

(3)

wherein $R^1$ to $R^4$ each independently denote an alkyl group having 1 to 20 carbon atoms or an aryl group having 6 to 20 carbon atoms; $R^5$ and $R^6$ each independently denote an alkylene group having 1 to 20 carbon atoms; m and n each independently denote an integer of 1 to 3; (m+n) denotes an integer of 4 or more; $R^7$ denotes an alkyl group having 1 to 20 carbon atoms, an aryl group having 6 to 20 carbon atoms, or a silyl group substituted with a hydrocarbon group; and in a case that a plurality of moieties is present as any of $R^1$ to $R^4$, they are independent of each other.

10. The method for producing the modified conjugated diene-based polymer according to claim 9, wherein the modifier comprises a modifier represented by the formula (1) with m and n therein being 2 and 3, respectively, or the modifier comprises a modifier represented by the formula (2) with each of m, n, and l therein being 3.

11. The method for producing the modified conjugated diene-based polymer according to claim 8, wherein the organolithium compound comprises an organolithium compound represented by any of following general formulas (14) to (17):

(14)

wherein $R^{10}$ and $R^{11}$ are each independently selected from the group consisting of an alkyl group having 1 to 12 carbon atoms, a cycloalkyl group having 3 to 14 carbon atoms, and an aralkyl group having 6 to 20 carbon atoms; $R^{10}$ and $R^{11}$ may be attached together to form a cyclic structure together with an adjacent nitrogen atom, and in this case, $R^{10}$ and $R^{11}$ denote an alkylene group having 5 to 12 carbon atoms, and may have an unsaturated bond or a branched structure in a part thereof;

(15)

wherein $R^{12}$ and $R^{13}$ are each independently selected from the group consisting of an alkyl group having 1 to 12 carbon atoms, a cycloalkyl group having 3 to 14 carbon atoms, and an aralkyl group having 6 to 20 carbon atoms; $R^{12}$ and $R^{13}$ may be attached together to form a cyclic structure together with an adjacent nitrogen atom, and in this case, $R^{12}$ and $R^{13}$ denote an alkyl group having 5 to 12 carbon atoms, and may have an unsaturated bond or a branched structure in a part thereof; and V denotes an alkylene group having 1 to 20 carbon atoms or a conjugated diene-based polymer having 4 to 20 carbon atoms;

(16)

wherein $R^{15}$ and $R^{16}$ are each independently selected from the group consisting of an alkyl group having 1 to 12 carbon atoms, a cycloalkyl group having 3 to 14 carbon atoms, and an aryl group having 6 to 20 carbon atoms; $R^{15}$ and $R^{16}$ may be attached together to form a cyclic structure together with an adjacent nitrogen atom, and in this case, $R^{15}$ and $R^{16}$ denote an alkylene group having 5 to 12 carbon atoms, and may have a branched structure in a part thereof;

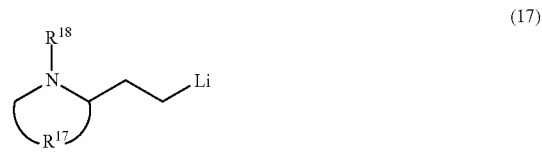

(17)

wherein $R^{17}$ denotes a hydrocarbon group having 2 to 10 carbon atoms, and may have an unsaturated bond or a branched structure in a part thereof; and $R^{18}$ denotes an alkyl group having 1 to 12 carbon atoms, and may have a branched structure in a part thereof.

12. The method for producing the modified conjugated diene-based polymer according to claim 8, wherein, in the polymerization step, polymerization is performed in a continuous type, a polymerization temperature is 45° C. or more and 80° C. or less, and a solid content is 16% by mass or less.

13. The method for producing the modified conjugated diene-based polymer according to claim 8, wherein, in the polymerization step, polymerization is performed in a continuous type, and a concentration of the organolithium compound is 0.010 mol/L or less based on a volume of a hydrocarbon solvent.

14. A modified conjugated diene-based polymer obtained through the method for producing the modified conjugated diene-based polymer according to claim 8.

15. The method for producing the modified conjugated diene-based polymer according to claim 8, wherein the modifier comprises a modifier represented by general formula (1):

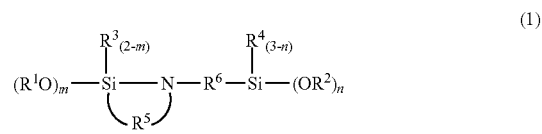

(1)

wherein
$R^1$ to $R^4$ each independently denote an alkyl group having 1 to 20 carbon atoms or an aryl group having 6 to 20 carbon atoms;

R⁵ denotes an alkylene group having 1 to 10 carbon atoms;

R⁶ denotes an alkylene group having 1 to 20 carbon atoms;

m denotes an integer of 1 or 2;

n denotes an integer of 2 or 3;

(m+n) denotes an integer of 4 or more; and in a case that a plurality of moieties is present as any of R¹ to R⁴, they are independent of each other.

16. The method for producing the modified conjugated diene-based polymer according to claim 8, wherein the organolithium compound comprises an organolithium compound represented by general formula (14):

(14)

wherein

R¹⁰ and R¹¹ are each independently selected from the group consisting of an alkyl group having 1 to 12 carbon atoms, a cycloalkyl group having 3 to 14 carbon atoms, and an aralkyl group having 6 to 20 carbon atoms;

R¹⁰ and R¹¹ may be attached together to form a cyclic structure together with an adjacent nitrogen atom, and in this case, R¹⁰ and R¹¹ denote an alkylene group having 5 to 12 carbon atoms, and may have an unsaturated bond or a branched structure in a part thereof.

17. A modified conjugated diene-based polymer composition comprising:

a rubber component and 0.5 parts by mass or more and 300 parts by mass or less of a silica-based inorganic filler based on 100 parts by mass of the rubber component, wherein the rubber component comprises 20 parts by mass or more of the modified conjugated diene-based polymer according to claim 1 based on 100 parts by mass of the rubber component.

18. A method for producing a modified conjugated diene-based polymer comprising a nitrogen atom, the method comprising steps of:

polymerizing at least a conjugated diene compound in a presence of an organolithium compound having at least one nitrogen atom in a molecule to obtain a conjugated diene-based polymer; and modifying the conjugated diene-based polymer with a modifier having four or more alkoxy groups bonding to a silyl group and a tertiary amino group in one molecule, wherein, in the modification step, a content of the conjugated diene compound is 100 ppm by mass or more and 50000 ppm by mass or less based on a total amount of a monomer and a polymer, wherein the modified conjugated diene-based polymer comprising a nitrogen atom has a content of the nitrogen atom of 25 ppm by mass or more based on a total amount of the modified conjugated diene-based polymer, a Mooney stress-relaxation rate measured at 110° C. of 0.45 or less, a modification percentage of 75% by mass or more, and a ratio of a first weight-average molecular weight to a first number-average molecular weight of 1.50 or more and 3.50 or less.

19. The method according to claim 18, wherein the modified conjugated diene-based polymer comprising a nitrogen atom has a content of the nitrogen atom of 40 ppm by mass or more based on a total amount of the modified conjugated diene-based polymer, a Mooney stress-relaxation rate measured at 110° C. of 0.45 or less, a modification percentage of 84.8% by mass or more, and a ratio of a first weight-average molecular weight to a first number-average molecular weight of 1.50 or more and 3.50 or less.

* * * * *